US008730669B2

(12) United States Patent
Locker et al.

(10) Patent No.: US 8,730,669 B2
(45) Date of Patent: May 20, 2014

(54) TRANSFORMER CASE FOR NOTEBOOK SLATE COMPUTER WITH WIRELESS KEYBOARD

(75) Inventors: Howard Locker, Cary, NC (US); Daryl Cromer, Cary, NC (US); Liu Jun Feng, Beijing (CN); Qian Ying Wang, Beijing (CN)

(73) Assignee: Lenovo (Singapore) Pte. Ltd., Singapore (SG)

( * ) Notice: Subject to any disclaimer, the term of this patent is extended or adjusted under 35 U.S.C. 154(b) by 1136 days.

(21) Appl. No.: 12/263,184

(22) Filed: Oct. 31, 2008

(65) Prior Publication Data

US 2010/0039764 A1 Feb. 18, 2010

Related U.S. Application Data

(63) Continuation-in-part of application No. 12/192,232, filed on Aug. 15, 2008.

(51) Int. Cl.
*H05K 5/00* (2006.01)
*H05K 7/00* (2006.01)
*G06K 3/02* (2006.01)

(52) U.S. Cl.
USPC .......... 361/681; 361/679.01; 361/679.06; 361/679.27; 361/679.28; 345/169

(58) Field of Classification Search
USPC .......... 361/679.01, 679.02, 679.08, 679.09, 361/679.3, 679.55–679.59, 681, 683, 361/679.21; 345/156, 157, 168, 169; 455/575.1; 312/223.1
See application file for complete search history.

(56) References Cited

U.S. PATENT DOCUMENTS

| 6,421,235 | B2 * | 7/2002 | Ditzik | 361/679.3 |
|---|---|---|---|---|
| 2007/0076362 | A1 * | 4/2007 | Lagnado | 361/683 |
| 2008/0062625 | A1 * | 3/2008 | Batio | 361/680 |
| 2008/0203817 | A1 * | 8/2008 | Luo et al. | 307/64 |

* cited by examiner

*Primary Examiner* — Jenny L Wagner
*Assistant Examiner* — Jerry Wu
(74) *Attorney, Agent, or Firm* — John L. Rogitz

(57) ABSTRACT

An approach is provided that uses a foldable transformable display case that includes two panels. The two panels are attached using a hinge. Two components are attachable to at least one of the panels. One of the two components is an integrated display screen. Another component is a keyboard unit. At least one of the components can be removed from the panels.

18 Claims, 19 Drawing Sheets

Tablet (Touch-Screen) Mode

Clamshell (Protected Travel) Configuration
(case folded at hinge and closed - wireless keyboard
and screen facing each other inside closed case)

TRANSFORMER CASE FOR NOTEBOOK SLATE COMPUTER WITH WIRELESS KEYBOARD

This application is a continuation-in-part application of co-pending U.S. Non-Provisional patent application Ser. No. 12/192,232, entitled "Slate Wireless Keyboard Charging and Connection," filed on Aug. 15, 2008.

BACKGROUND OF THE INVENTION

1. Technical Field

The present invention relates to an approach for connecting and charging a wireless keyboard. More particularly, the present invention relates to charging a wireless keyboard used in a slate computer by attaching the wireless keyboard to the slate computer and charging the keyboard using the slate computer unit.

2. Description of the Related Art

Slate computer systems are also referred to as tablet computer systems (tablet PCs). The name "slate" computer derives from the unit's slate shape which is generally easy for a user to hold. Slate (tablet) PCs are often popular in situations where use of a normal notebook computer is impractical, unwieldy, or otherwise does not provide the functionality needed by the user. Wireless keyboards are often popular, especially with slate computers, because of their flexibility in placement which melds with the flexibility provided by the slate computer system.

One challenge of slate computer systems that utilize wireless keyboards is that the wireless keyboard is powered by its own battery. If the wireless keyboard runs out of battery power, the keyboard can generally not be used with the slate computer system without replacing the keyboard's batteries (e.g., "AA," "AAA," etc.). This can be problematic due to the slate computer's popularity in performing "field work" which may be a remote location distant from traditional battery suppliers such as stores and the like.

SUMMARY

It has been discovered that the aforementioned challenges are resolved using a foldable transformable display case that includes two panels. The two panels are attached using a hinge. Two components are attachable to at least one of the panels. One of the two components is an integrated display screen. Another component is a keyboard unit. At least one of the components can be removed from the panels.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention. Instead, the following is intended to provide a detailed description of an example of the invention and should not be taken to be limiting of the invention itself. Rather, any number of variations may fall within the scope of the invention, which is defined by the claims that follow the description.

The following detailed description will generally follow the summary of the invention, as set forth above, further explaining and expanding the definitions of the various aspects and embodiments of the invention as necessary. To this end, this detailed description first sets forth a computing environment in FIG. 1 that is suitable to implement the software and/or hardware techniques associated with the invention. A networked environment is illustrated in FIG. 2 as an extension of the basic computing environment, to emphasize that modern computing techniques can be performed across multiple discrete devices.

Figure 1:
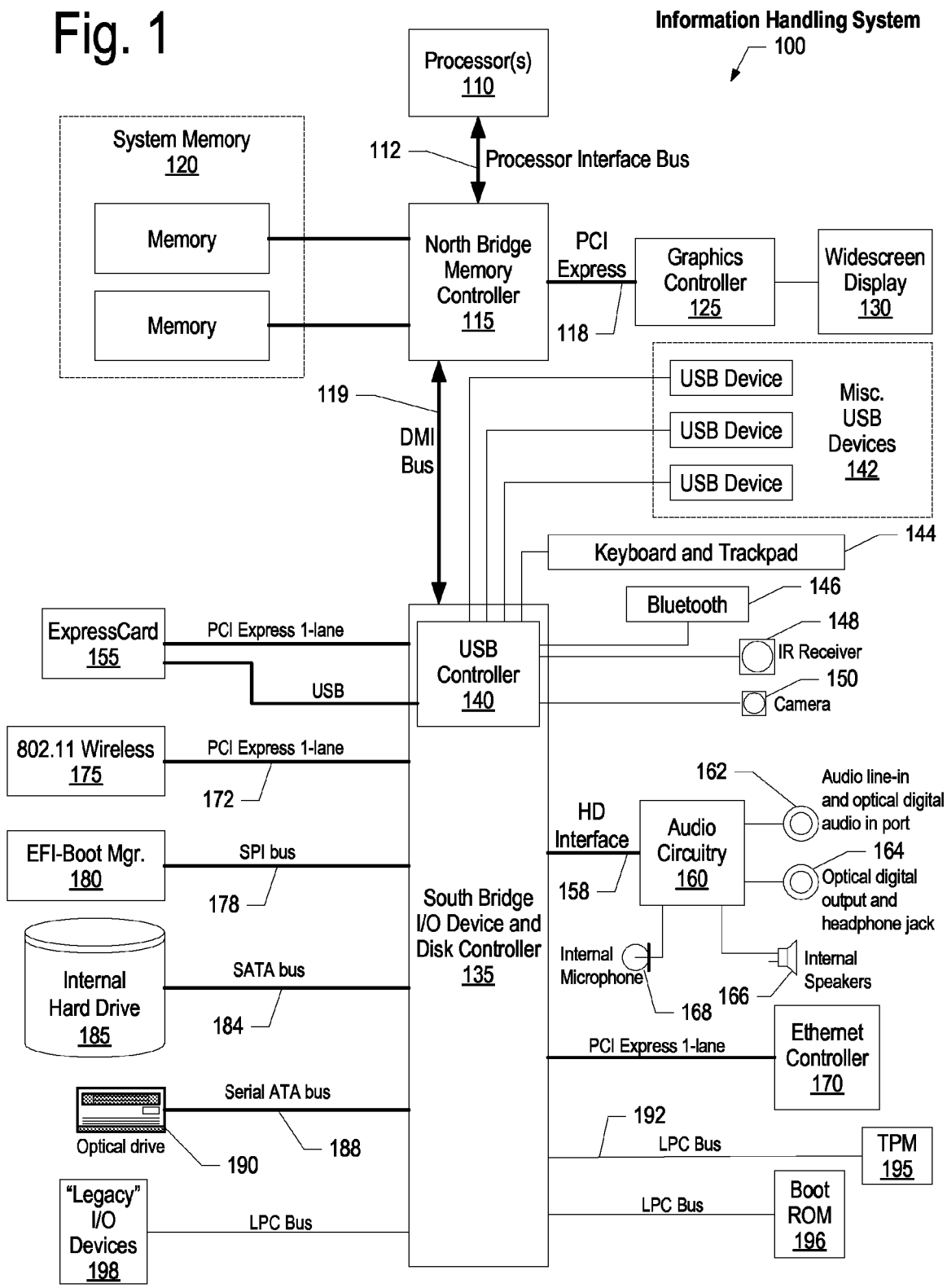
FIG. 1 is a block diagram of a data processing system in which the methods described herein can be implemented.
Figure 2:
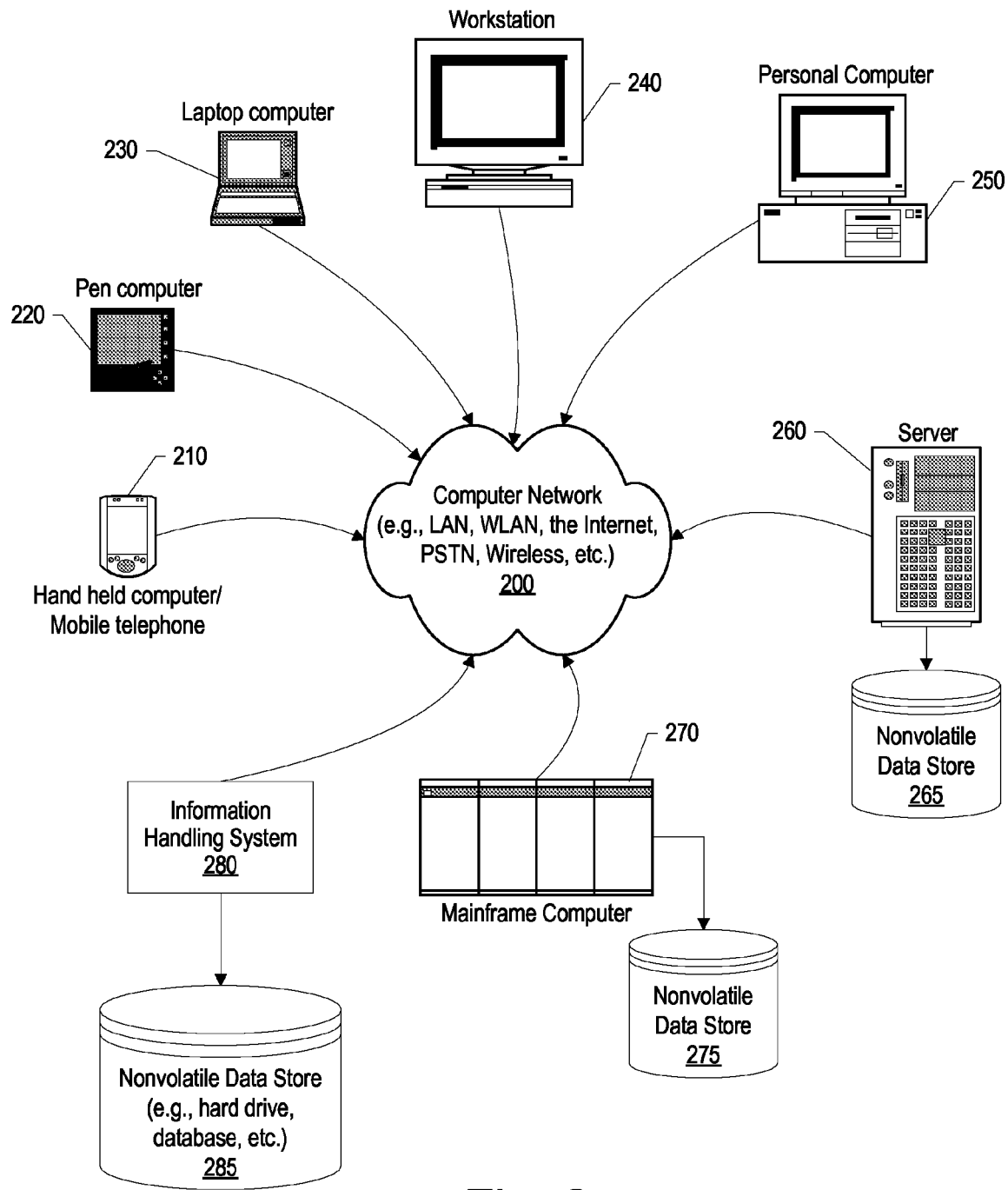
FIG. 2 provides an extension of the information handling system environment shown in FIG. 1 to illustrate that the methods described herein can be performed on a wide variety of information handling systems which operate in a networked environment.

FIG. 1 illustrates information handling system 100 which is a simplified example of a computer system capable of performing the computing operations described herein. Information handling system 100 includes one or more processors 110 which is coupled to processor interface bus 112. Processor interface bus 112 connects processors 110 to Northbridge 115, which is also known as the Memory Controller Hub (MCH). Northbridge 115 is connected to system memory 120 and provides a means for processor(s) 110 to access the system memory. Graphics controller 125 is also connected to Northbridge 115. In one embodiment, PCI Express bus 118 is used to connect Northbridge 115 to graphics controller 125. Graphics controller 125 is connected to display device 130, such as a computer monitor.

Northbridge 115 and Southbridge 135 are connected to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus is used to connect the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses can include PCI and PCI Express busses, an ISA bus, a System Management Bus (SMBus or SMB), a Low Pin Count (LPC) bus. The LPC bus is often used to connect low-bandwidth devices, such as boot ROM 196 and "legacy" I/O devices (using a "super I/O" chip). The "legacy" I/O devices (198) can include serial and parallel ports, keyboard, mouse, floppy disk controller. The LPC bus is also used to connect Southbridge 135 to Trusted Platform Module (TPM) 195. Other components often included in Southbridge 135 include a Direct Memory Access (DMA) controller, a Programmable Interrupt Controller (PIC), a storage device controller, which connects Southbridge 135 to nonvolatile storage device 300 such as a hybrid hard disk drive, using bus 184.

ExpressCard 155 is a slot used to connect hot-pluggable devices to the information handling system. ExpressCard 155 supports both PCI Express and USB connectivity as it is connected to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, Bluetooth device 146 which provides for wireless personal area networks (PANs), keyboard and trackpad 144, and other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etc. Removable storage device 145 can also be a hybrid disk drive, such as hybrid disk drive 300 shown in FIGS. 3-6.

Wireless Local Area Network (LAN) device 175 is connected to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Optical storage device 190 is connected to Southbridge 135 using Serial ATA (SATA) bus 188. Serial ATA adapters and devices communicate over a high-speed serial link. The Serial ATA bus is also used to connect Southbridge 135 to other forms of storage devices, such as hard disk drives. Audio circuitry 160, such as a sound card, is connected to Southbridge 135 via bus 158. Audio circuitry 160 is used to provide functionality such as audio line-in and optical digital audio in port 162, optical digital output and headphone jack 164, internal speakers 166, and internal microphone 168. Ethernet controller 170 is connected to Southbridge 135 using a bus, such as the PCI or PCI Express bus. Ethernet controller 170 is used to connect information handling system 100 with a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of information handling systems which operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling system include nonvolatile data stores, such as hard drives and/or nonvolatile memory. Some of the information handling systems shown in FIG. 2 are depicted with separate nonvolatile data stores (server 260 is shown with nonvolatile data store 265, mainframe computer 270 is shown with nonvolatile data store 275, and information handling system 280 is shown with nonvolatile data store 285). The nonvolatile data store can be a component that is external to the various information handling systems or can be internal to one of the information handling systems. In addition, removable nonvolatile storage device 145 can be shared amongst two or more information handling systems using various techniques, such as connecting the removable nonvolatile storage device 145 to a USB port or other connector of the information handling systems.

Figure 3:
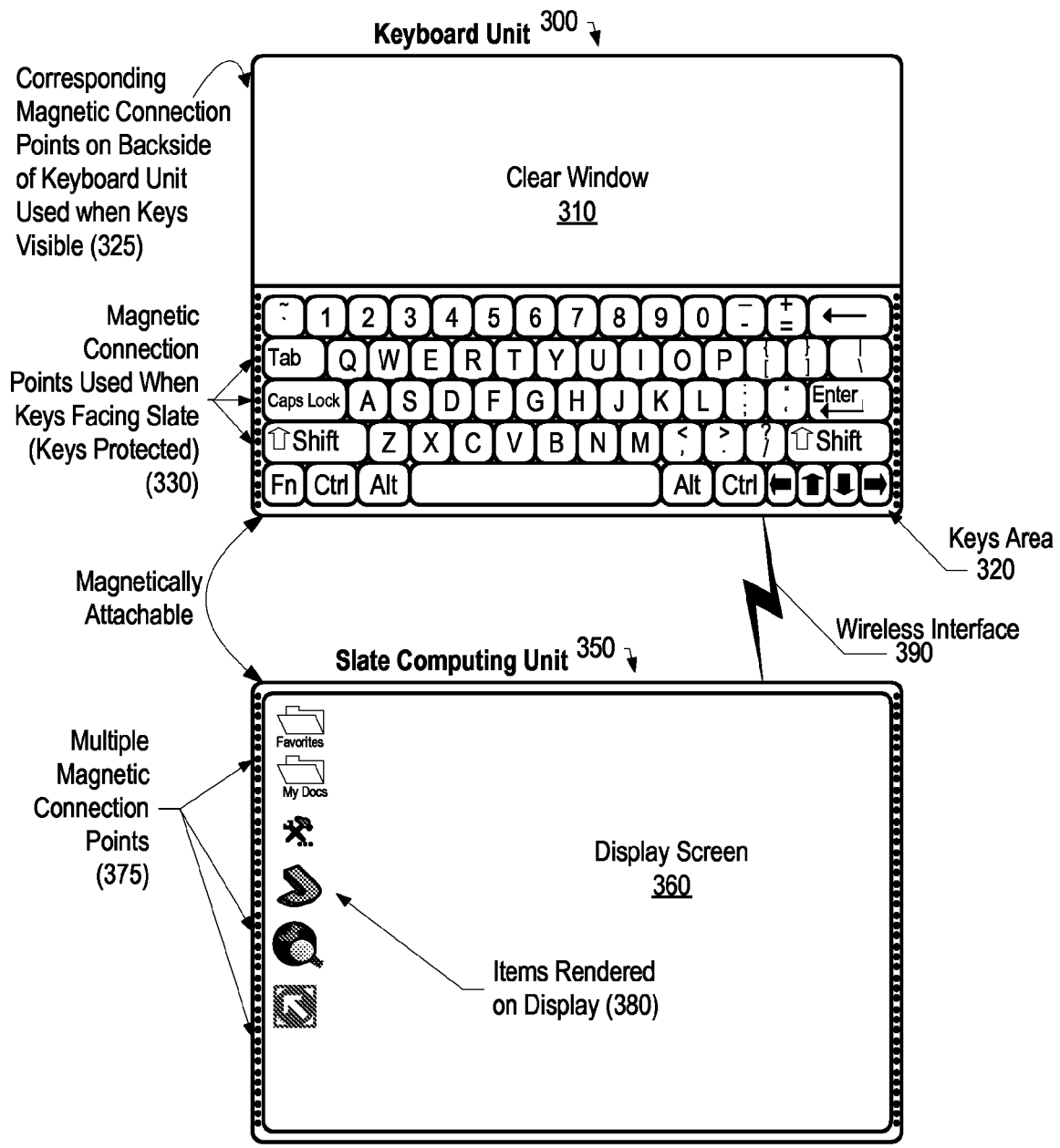
FIG. 3 is a diagram showing a mobile computer system with an integrated display and a wireless keyboard that transmits signals to the mobile computer system.

FIG. 3 is a diagram showing a mobile computer system with an integrated display and a wireless keyboard that transmits signals to the mobile computer system. Keyboard unit 300 includes optional clear window 310 and keys area 320. In one embodiment, clear window 310 can be removed or folded back when it is not needed. Keyboard unit 300 also includes connection points 325 located on the backside of the keyboard unit. In one embodiment, connection points 325 are magnetic and, in a further embodiment, the magnetic connection points are electromagnetic so that the magnetic connection between keyboard unit 300 and slate computing unit 350 can be engaged and disengaged with an electronic signal. In a further embodiment, magnetic connection points 330 are used to connect keyboard unit 300 with slate computing unit 350 when the keyboard (keys area 320) are not being used (e.g., to protect keys area 320 and to protect display screen 360 of slate computing unit 360. In one embodiment, as shown, the keyboard is electrically connected via contacts. In another embodiment, the keyboard is inductively connected, while in another embodiment the keyboard is wirelessly connected.

Slate computing unit 350 includes display screen 360. In one embodiment, computer components (e.g., processor, memory, nonvolatile storage, etc.) are incorporated in slate computing unit 350, while in another embodiment these computer components are incorporated in keyboard unit 300. Multiple connection points 375 are also included in slate computing unit 350. As described above, in one embodiment these connection points are magnetic and in a further embodiment these connection points are electromagnetic in order to affix keyboard unit 300 to slate computing unit 350. Having an electromagnetic connection enables keyboard unit 300 and slate computing unit 350 to be electromagnetically connected to each other with the connection being engaged or disengaged using an electronic signal that engages/disengages the electromagnets. Multiple connection points are provided so that, when affixed, the keyboard unit can be moved by the user in order to expose more or less of display screen 360 through clear window 310 or area not covered by keyboard with the keyboard unit being on top of the slate computing unit. Visible items 380, such as text, graphics, icons, etc., are rendered on display screen 360.

Wireless interface 390 is used to transmit signals between keyboard unit 300 and slate computing unit 350. In this manner, keyboard unit 300 can be completely removed from slate computing unit 350 and still communicate with the slate computing unit using wireless interface 390, such as a Bluetooth interface. In one embodiment, when keyboard unit 300 is affixed to slate computing unit by having connection points 375 included in the slate computing unit connect to either connection points 325 on the backside of keyboard unit 300, signals are transmitted from the keyboard unit to the slate computing unit via the connection points so that wireless interface 390 can be turned off. Turning off wireless interface 390 may be needed in some environments, such as during air travel, and can also be used to conserve the battery that powers keyboard unit 300.

When keyboard unit 300 is connected to slate computing unit 350, power can be transmitted between the units in order to provide power to unit components, such as batteries. For example, when connected, slate computing unit 350 can provide power to keyboard unit 300 in order to charge one or more batteries included in keyboard unit 300 and to power other power-consuming keyboard components, such as a backlight or otherwise provide keyboard illumination.

Figure 4:
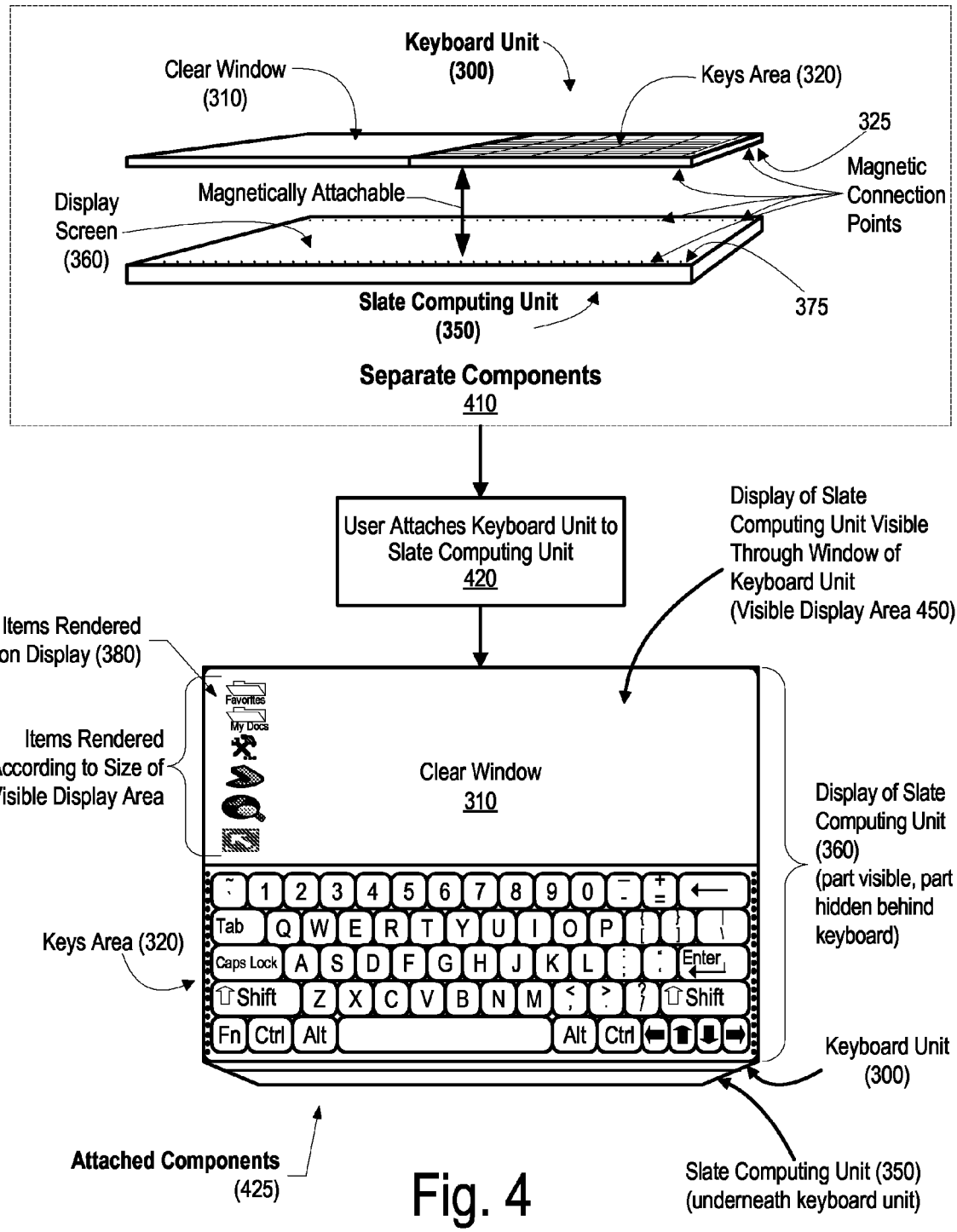
FIG. 4 is a diagram showing the keyboard unit being connected to the mobile computer system using a connector, such as a set of magnetic connection points, that position the keyboard unit on top of the mobile computer system.

FIG. 4 is a diagram showing the keyboard unit being connected to the mobile computer system using a connector, such as a set of magnetic connection points, that position the keyboard unit on top of the mobile computer system. Separate components depiction 410 shows keyboard unit 300 detached from slate computing unit 350. When placed directly over the slate computing unit, it can be seen that a portion of display screen 360 is visible through clear window 310. In addition, it can be seen that magnetic connection points 325 are aligned with magnetic connection points 375. Because there are multiple connection points on both keyboard unit 300 and slate computing unit 375, the user can slide keyboard unit up and down (north/south) in order to see more of display screen 360 through clear window 310 (or, if clear window 310 is removed, then more or less of display screen 360 is visible over the keys area depending on where the user positions the keyboard unit).

At step 420, the user attaches keyboard unit 300 to slate computing unit 350 (e.g., by placing keyboard unit on top of slate computing unit 350 so that the connection points (magnetic, electromagnetic, etc.) are aligned and engaged). Attaching keyboard unit 300 to slate computing unit 350 results in attached components depiction 425. When the units are attached, display 360 included in the slate computing unit is partially visible (visible display area 450, e.g., the display area visible through clear window 310) with keys area 320 blocking part of display screen 360. Sensors, such as the connection points 325 and 375, are used to determine how much of display screen 360 is visible. Items 380 rendered on display screen 380 are rendered according to the amount of visible display screen area. In one embodiment (shown in FIG. 4), items are rendered by altering the size of the items displayed on the display screen. In another embodiment, vertical scroll bars are displayed on display screen 360 to allow the user to scroll up and down to view different parts of display screen in order to view areas of display screen that are hidden behind keys area 320.

Figure 5:
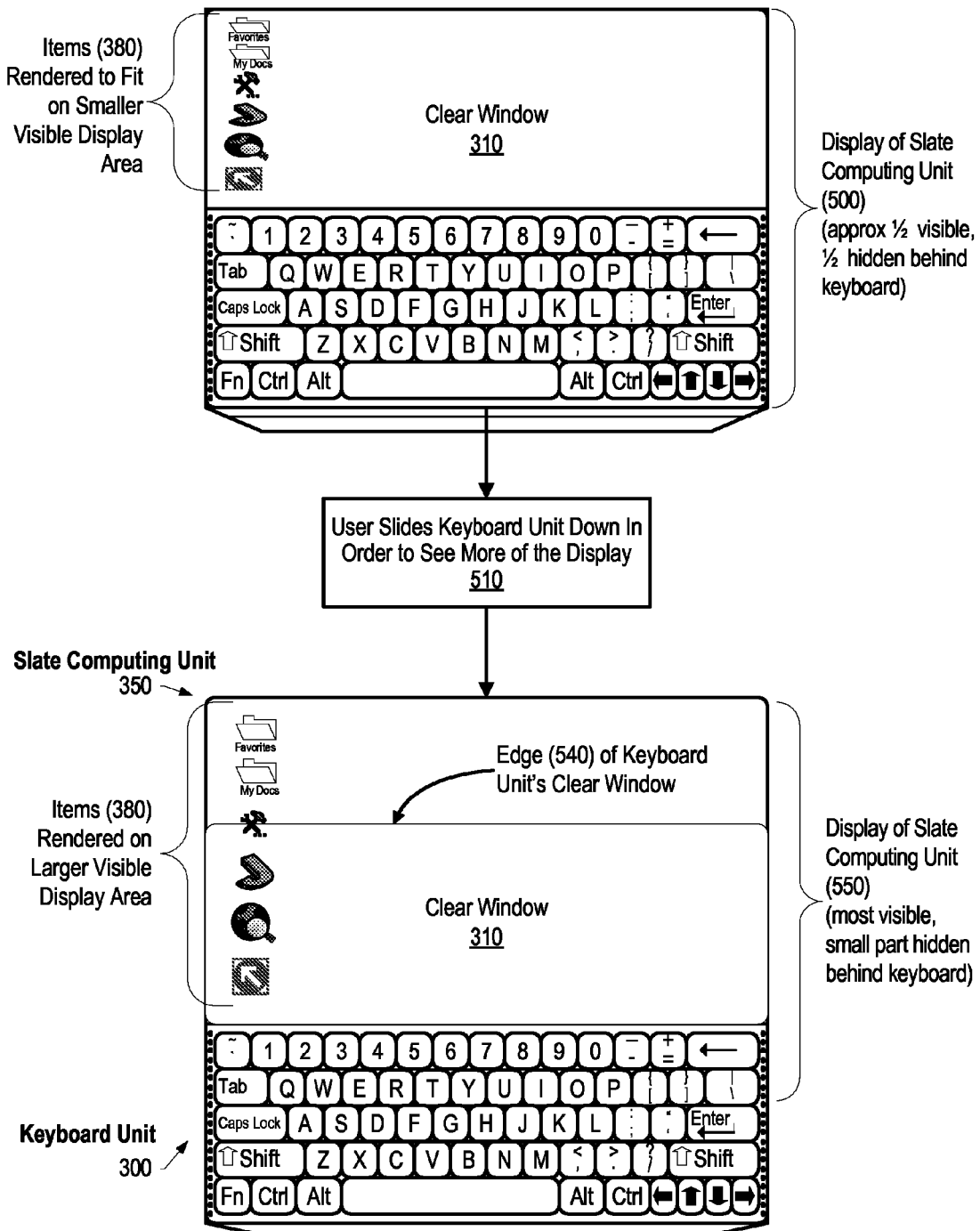
FIG. 5 is a diagram showing the keyboard unit being slid in relation to the mobile computer system in order to view more of the display.

FIG. 5 is a diagram showing the keyboard unit being slid in relation to the mobile computer system in order to view more of the display. Depiction 500 shows an embodiment when the keyboard unit is affixed directly on top of slate computing unit 350. In this embodiment, approximately half of the display screen is visible with items 380 rendered to fit on the smaller visible display area. At step 510, the user slides the keyboard unit down in order to expose more of display screen 360, resulting in depiction 550 where most of the display screen is visible and the visible display area being somewhat larger than in depiction 500. After moving the keyboard unit to display more of the display screen, items 380 are rendered larger than the same items were rendered in depiction 500 because of the larger visible display area.

Figure 6:
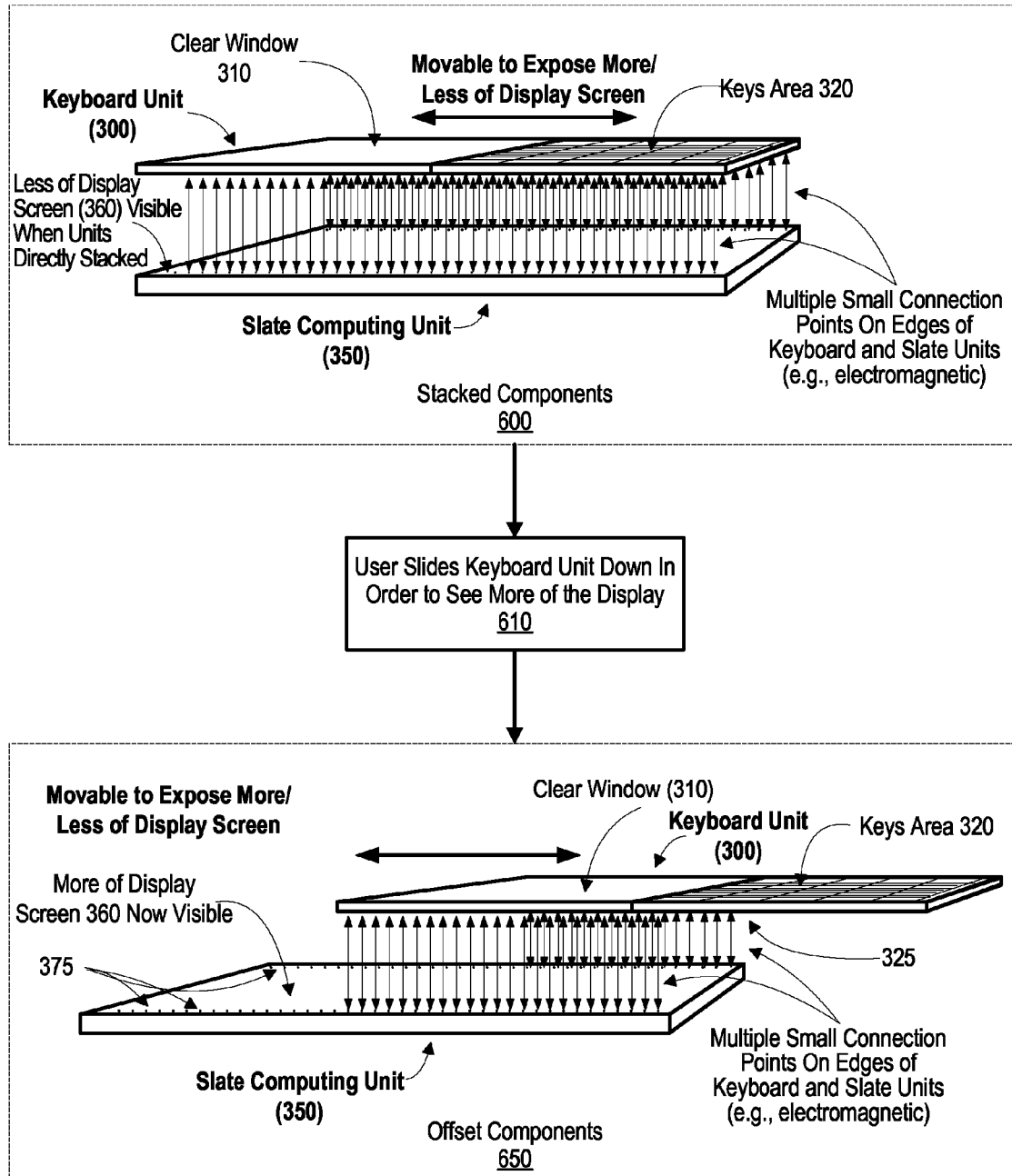
FIG. 6 is diagram showing how multiple magnetic connection points are used to connect the keyboard unit to the mobile computer system in both a stacked situation as well as a keyboard-offset situation.

FIG. 6 is diagram showing how multiple magnetic connection points are used to connect the keyboard unit to the mobile computer system in both a stacked situation as well as a keyboard-offset situation. FIG. 6 shows a stacked components depiction (600) as well as an offset components depiction (650), similar to depictions 500 and 550 shown in FIG. 5, however the depictions in FIG. 6 are shown from a side perspective so that the connection points between keyboard unit 300 and slate computing unit 350 are visible. When stacked (depiction 600), it can be seen that less of display screen 360 is visible (e.g., through clear window 310) than when the components are offset (depiction 650), where more of display screen 360 is visible above keys are 320.

When components are in a stacked orientation (depiction 600), multiple connection points along the edges of keyboard unit 300 and slate computing unit 350 connect the keyboard unit to the slate computing unit. At step 610, the user slides keyboard unit 300 in order to view more of display screen 360 and create a larger visible display area. As previously described, various methods can be used to connect the keyboard unit to the slate computing unit. In one embodiment, the connection is magnetic and, in a further embodiment, the connection is electromagnetic so that the connection can be engaged and disengaged using electrical signals. At step 610, the user slides the keyboard unit so that the units are still connected using a subset of the multiple connection points that were used to connect the units when the stacked orientation was used. In depiction 650, clear window 310 is shown overlaying part of display screen 360 so that part of display screen 360 is covered by keys area 320 and part of the display screen is uncovered. In one embodiment, clear window 310 can be folded back or removed so that the keys area covers part of the display screen and the rest of the display screen is uncovered. In another embodiment, clear window 310 is resizable so that it can be expanded to cover the visible display area (e.g., clear window 310 can be extended out from keys area either when the user slides the keyboard unit in step 610 or in a separate step where the user manually extends the clear window so that it covers the visible display area.

In one embodiment, in both the stacked orientation (600) as well as the offset orientation (650), one or more of the multiple connection points are used to transfer power between the units (e.g., having slate computing unit 350 provide power to keyboard unit 300 in order to provide power to various keyboard unit components, such as a wireless interface (e.g., Bluetooth, etc.), one or more keyboard batteries, keyboard lights, etc.). In one embodiment, the multiple connection points, or separate sensors, are used to detect the size of the visible display area based on where the keyboard unit is oriented in respect to the slate computing unit. In a further embodiment, this detection is used to automatically resize the visible display area so that items are displayed in the visible display area rather than displayed underneath keys area 320 where they would not be visible to the user. In a further embodiment, the displayed items are rendered to fit into the visible display area by changing the aspect ratio of the visible display area so that items appear smaller when there is less visible display area and the same items appear larger when the visible display area size is increased by the user sliding the keyboard unit to reveal more of the display screen.

Figure 7:
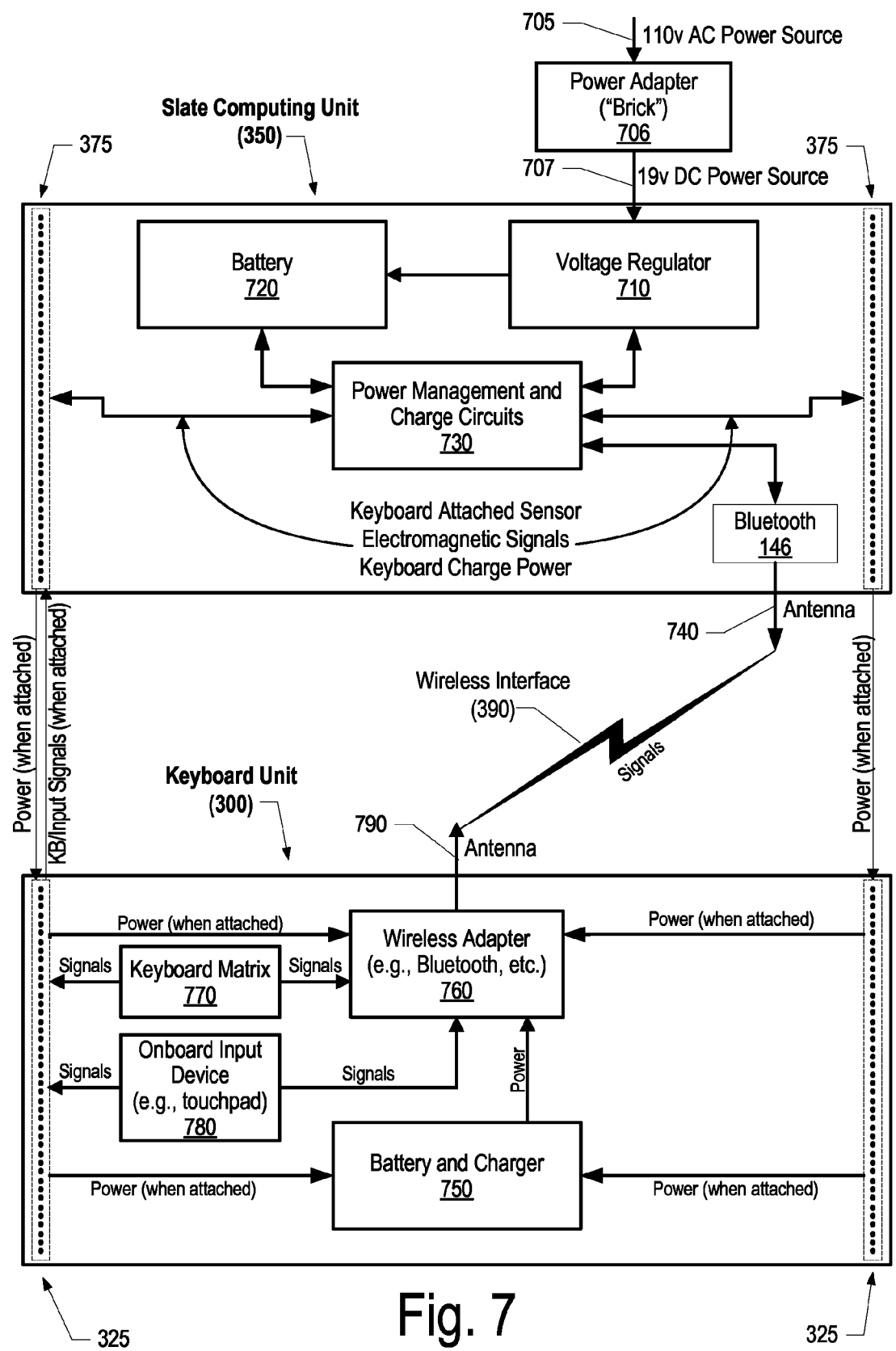
FIG. 7 is a block diagram showing certain components in the keyboard unit and the mobile computer system and how the components are used to interconnect the keyboard with the mobile computer system.

FIG. 7 is a block diagram showing certain components in the keyboard unit and the mobile computer system and how the components are used to interconnect the keyboard with the mobile computer system. In one embodiment, slate computing unit 350 receives power from AC power source 705, such as a standard electrical outlet. This power (e.g., 110v AC) is converted to direct current (e.g. 19v DC) by power adapter 706. DC power 707 is then supplied to voltage regulator 710 for distribution to various components. Slate computing unit 350 further includes voltage regulator 710 that is used to convert the direct current into the voltages required by the various components. Voltage regulator 710 provides power to slate computing unit batter 720 in order to charge the battery so the slate computing unit can run off of battery power when the A/C power source (705) is disconnected. Slate computing unit 350 also includes power management and charge circuits 730 that determine where to distribute power. Multiple connection points 375 are used to provide signals to power management and charge circuits to indicate whether keyboard unit 300 is connected to the slate computing unit. In one embodiment, when a connection is detected, power management and charge circuits 730 provide power to multiple connection points 375 located on the edge of the slate computing unit. This power can be used to provide power to the keyboard unit through the connection as well as to engage an electromagnetic connection between the keyboard unit and the slate computing unit. In addition, keyboard or other input can be received from the keyboard unit back to the slate computing unit where it is received and processed by power management and charge circuits 730 (e.g., such as the user pressing a key or button on the keyboard unit to disengage the electromagnetic connection). Power management and charge circuits 730 are also used to provide power to wireless adapter 146, such as a Bluetooth interface, that is used to communicate with keyboard unit 300 via antenna 740. In one embodiment, when the keyboard unit is connected to the slate computing unit, keyboard unit signals are transmitted between the units using the multiple connection points (325 and 375) and power management and charge circuits 730 are used to turn off wireless adapter 146 when it is not being used. However, when keyboard unit 300 is not connected to slate computing unit, then power management and charge circuits 730 are used to provide power to wireless adapter 146 so that the slate computing unit can receive keyboard unit signals transmitted from the keyboard unit via wireless interface 390 that is established between the keyboard unit and the slate computing unit.

Keyboard unit 300 includes a number of components used to provide keyboard signals to slate computing unit when the keyboard unit is connected to the slate computing unit as well as when the keyboard unit is not connected to the slate computing unit. When connected, power is received from slate computing unit through one or more of multiple connection points 325. This power is used to charge keyboard unit battery 750. Keyboard unit batter 750 is used to power wireless adapter 760 that is used to wirelessly transmit keyboard unit signals through antenna 790 and received by wireless adapter 740 included in the slate computing unit (e.g., by establishing wireless interface 390 between the units). Keyboard matrix 770 and onboard input device(s) 780 are used to generate keyboard unit signals (e.g., keys pressed by the user, mouse or input device movement, etc.). In one embodiment, the wireless interface is only used when the units are not connected Examples of onboard input device(s) 780 include touchpad, trackpoint, or both. In this embodiment, power is not provided by battery 750 to wireless adapter 760 when the units are connected. Instead, when the units are connected, keyboard unit signals are transmitted from keyboard unit 300 to slate computing unit 350 using one or more of multiple connection points (325 and 375).

Figure 8:
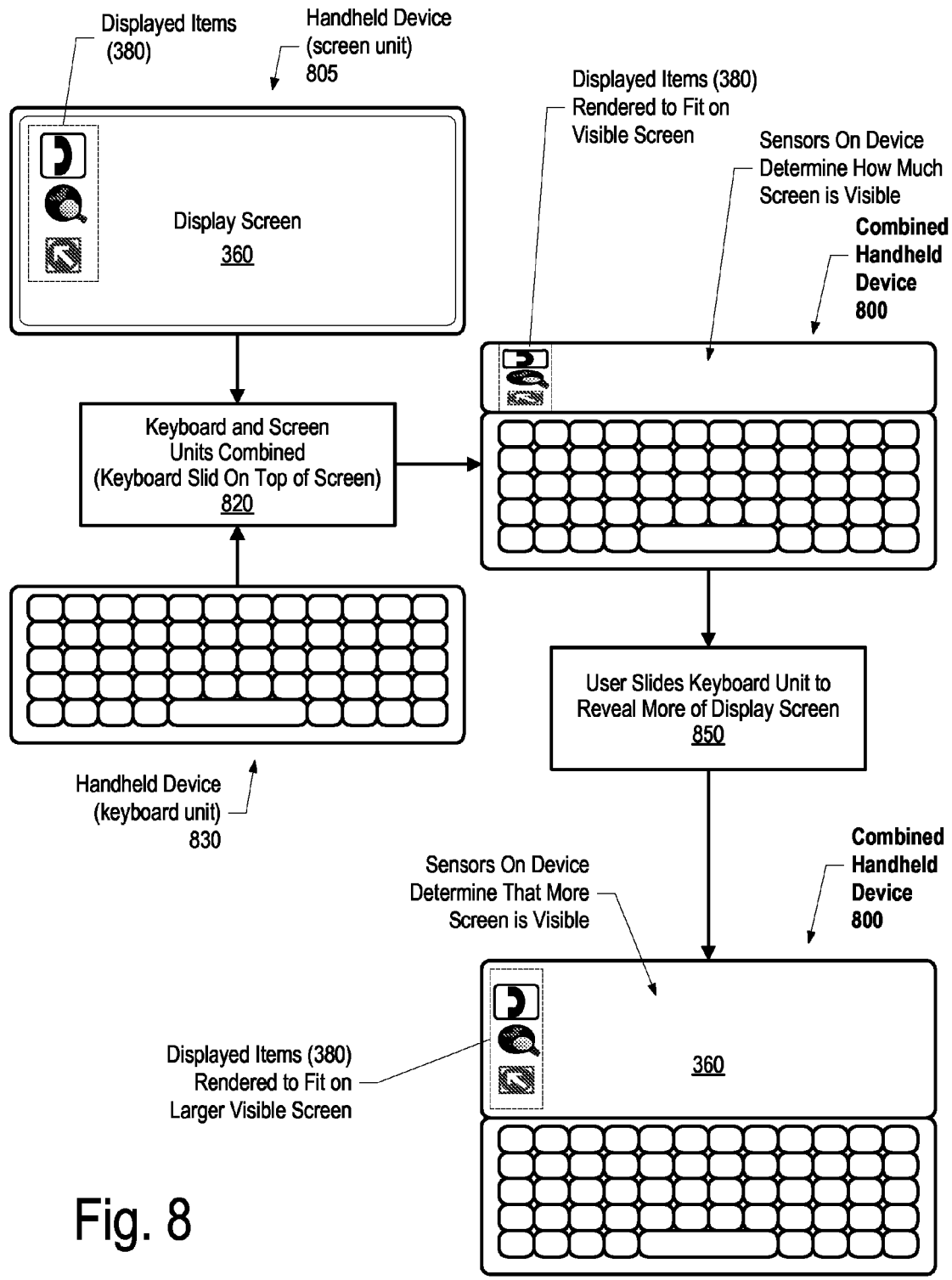
FIG. 8 is a diagram showing a handheld computer system with integrated keyboard rendering different sized graphics depending on the amount of visible screen space.

FIG. 8 is a diagram showing a handheld computer system with integrated keyboard rendering different sized graphics depending on the amount of visible screen space. Handheld device 800 includes display screen unit 805 and keyboard unit 830. Handheld device 800 is similar to the combined keyboard unit 300 and slate computing unit 350 shown in previous figures (e.g., FIG. 4), however handheld device depicts a smaller form factor, such as that used in a Personal Digital Assistant (PDA), mobile telephone, etc. Handheld device 800 may include a clear window, such as that shown in previous figures such as FIG. 4, or may not have a clear window in order to reduce the form factor in some designs. In one embodiment, display screen unit 805 includes processing components similar to slate computing unit 350 that was shown and described in previous figures (e.g., FIG. 3, etc.).

Displayed items 380 appear on display screen 360 depending on the amount of visible display area that appears. At step 820 keyboard unit 830 is attached to display screen unit 805. In one embodiment, the units are attachable by the user, while in another embodiment, the units are attached during manufacturing process so that the units are not user detachable (e.g., in a mobile telephone application where it is desired to keep the keyboard unit affixed to the screen unit). Attachment of screen unit 805 to keyboard unit 830 results in combined handheld unit 800. Similar to the screen and keyboard units described in FIGS. 3-7, the screen is affixed in a manner so that the keyboard unit can slide up and down to reveal more or less of display screen 360. In one embodiment, one of the units includes a sleeve (e.g., at the edges of the units) so that the other unit slides up and down in relation to the unit with the sleeve. Sensors are included on one or more of the units in order to determine the size of the visible screen area. This determined size is used to render displayed items 380 so that the displayed items appear on the visible display area rather than being hidden beneath the keyboard unit.

In step 850, the user slides the keyboard unit to reveal more or less of the display screen. Displayed items 380 are rendered to fit on the visible display area. When more of display screen 360 is visible, displayed items 380 are displayed larger than when less of display screen 360 is visible. In this manner, the user can slide the keyboard up and down in order to increase or decrease the visible display area and the display unit adjusts the size of the rendered displayed items 380 in order for the displayed items to fit in the visible display area. In one embodiment, the keyboard unit is not slid over the top of the display screen but is simply inserted over the screen for a two-position implementation (e.g., screen visible or screen hidden).

Figure 9:
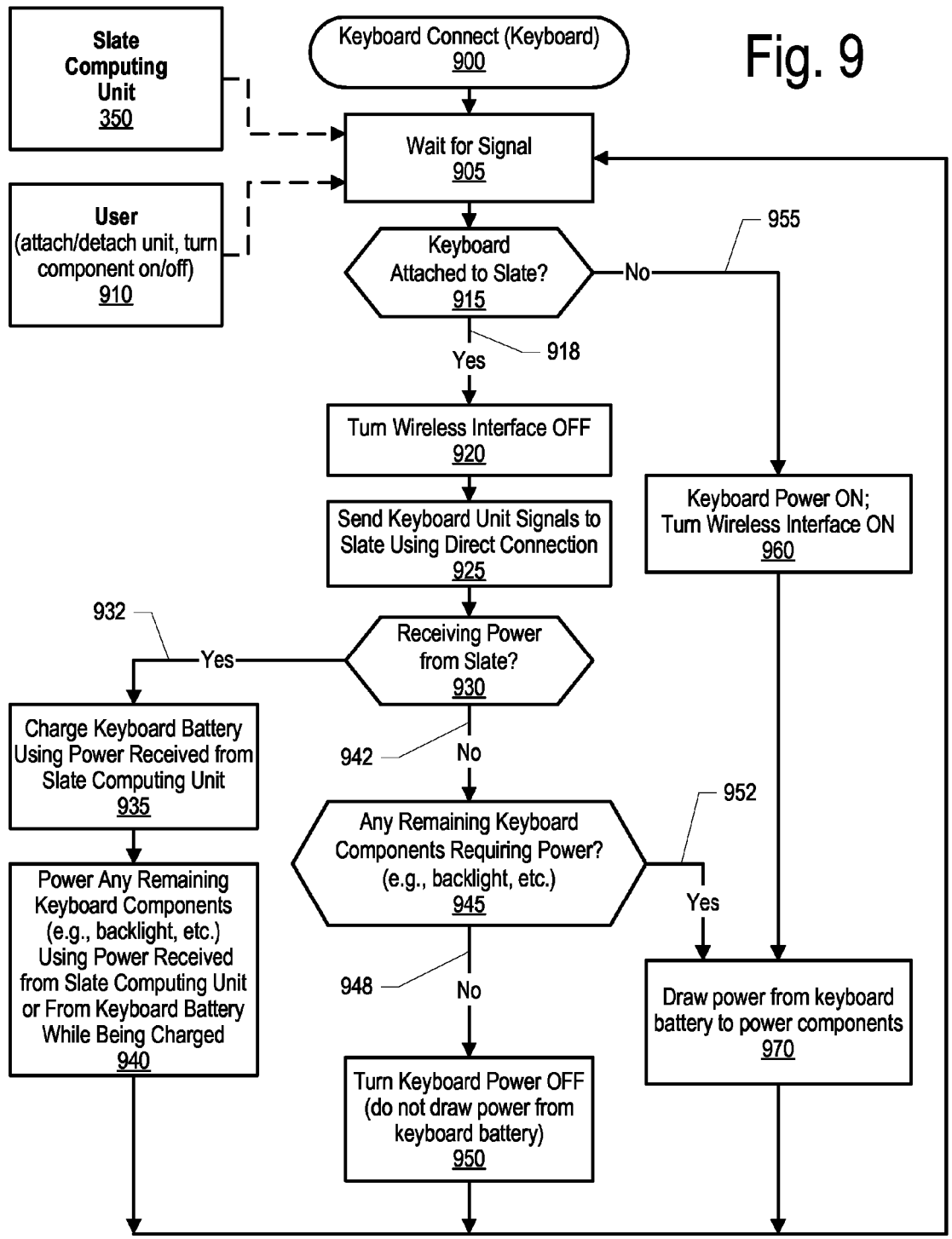
FIG. 9 is a flowchart showing steps taken by the mobile computer system unit for managing power of the keyboard unit.

FIG. 9 is a flowchart showing steps taken by the mobile computer system unit for managing power of the keyboard unit. Processing commences at 900 whereupon, at step 905, the slate computing unit checks for an attachment of the keyboard unit. A determination is made as to whether the keyboard unit is proximate to the slate computing unit (decision 910). If the units are proximate to each other, then decision 910 branches to "yes" branch 912 whereupon, at step 915, one or more user preferences are checked. At step 920, the slate computing unit's power supply status is checked (e.g., connected to A/C power, running on battery power, etc.). A determination is made as to whether an electromagnetic connection is desired between the units (decision 925) based upon the capabilities of the units (e.g., whether electromagnetic attachment is enabled) and possibly based on user preferences. If an electromagnetic connection is desired, then decision 925 branches to "yes" branch 928 whereupon, at step 930, power is sent to the electromagnetic connection points in order to activate the electromagnetic connection. On the other hand, if an electromagnetic connection is not desired, then decision 925 branches to "no" branch 932 whereupon, at step 935, another attachment means is used to connect the units to each other (e.g., mechanical connection, sleeve-based connection, standard magnetic connection, etc.).

In one embodiment when the units are connected to each other, the slate computing unit receives keyboard unit signals through the connection rather than through a wireless interface. In this embodiment, at step 940, the wireless keyboard adapters are turned off and the slate computing unit receives keyboard unit input through the physical connection that has been established due to the proximity (e.g., touching, within magnetic range, etc.) of the units. At step 945, the slate computing unit periodically receives power status from the keyboard unit (e.g., power level of the keyboard unit, whether the battery of the keyboard unit is running low, etc.). A determination is made as to whether the send power from the slate computing unit to the keyboard unit in order to charge the keyboard unit's battery (decision 950). This determination is made based on a variety of factors such as whether the slate computing unit is receiving A/C power input, the power level of the slate computing unit's battery, and the power level of the keyboard unit's battery. For example, when the slate computing unit is running on battery power, power may not be provided to the keyboard unit unless the keyboard unit is running low on battery power in order to conserve the slate computing unit's battery. If the determination is to provide power to the keyboard unit, then decision 950 branches to "yes" branch 952 whereupon, at step 955, power is sent through one or more of the slate computing unit's connection points so that the power can be received by the keyboard unit and used to charge the keyboard unit's battery and power other keyboard unit components. On the other hand, if the determination is to not provide power to the keyboard unit at this time, then decision 950 branches to "no" branch 958 bypassing step 955. At step 990, the slate computing unit waits for the next attachment check whereupon, when received, it loops back to check the attachment of the keyboard unit.

Returning to decision 910, if the keyboard unit is not proximate to the slate computing unit (e.g., the keyboard unit has been removed so that the wireless interface between the units is utilized to send keyboard unit signals to the slate computing unit), then decision 910 branches to "no" branch 960 whereupon, at step 970, the wireless adapter (e.g., Bluetooth) used to receive wireless keyboard unit signals is turned on (if not already turned on), and the slate computing unit receives keyboard unit signals using the wireless interface. At step 980, the keyboard unit is powered by its battery rather than receiving any power from the slate computing unit (see FIG. 10 and corresponding text for processing details regarding the keyboard units operation). At step 990, the slate computing unit waits for the next attachment check whereupon, when received, it loops back to check the attachment of the keyboard unit.

The wait at step 990 can be controlled by a timer (e.g., every minute, etc.) as well as by sensors that indicate whether the keyboard unit has been moved in relation to the slate computing unit (e.g., either slid up/down to reveal more or less of the display screen or removed in order to run the keyboard unit using the wireless interface). In another embodiment, when the keyboard is attached or detached the processor receives an interrupt and then performs steps shown in this FIG. 9. In addition, one or more keys or button on the keyboard unit can be used to request attachment/detachment of the keyboard unit to the slate computing unit.

For example, when an electromagnetic attachment is used, a button on the keyboard can be used to toggle whether the electromagnetic attachment is engaged or disengaged. In this example, the user might press the button to disengage the electromagnetic attachment before removing the keyboard unit from the slate computing unit. Additionally, such a button could be used to disengage the attachment so that the keyboard unit could be more easily slid up or down in relation to the slate computing unit.

Figure 10:
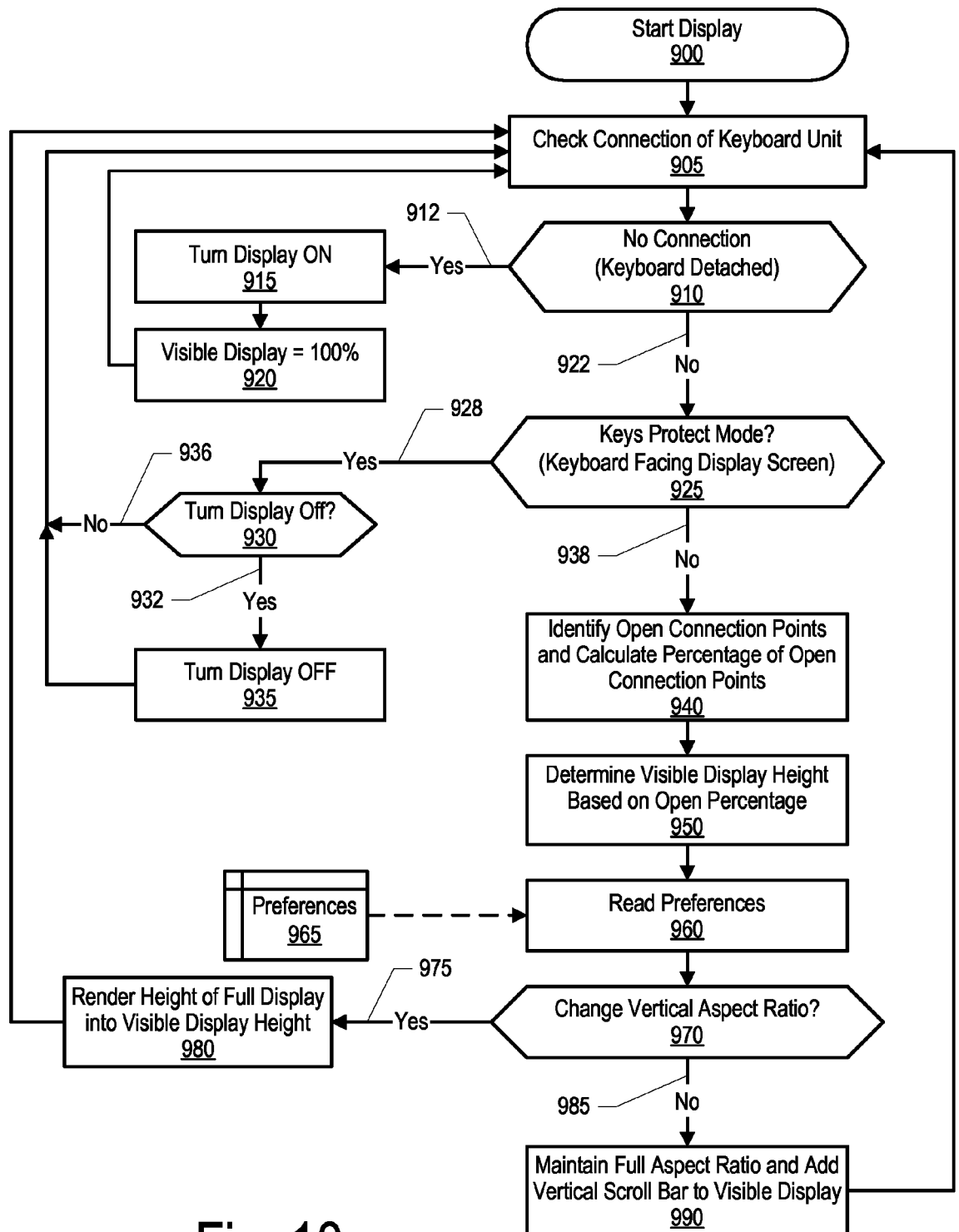
FIG. 10 is a flowchart showing steps taken by the keyboard unit for managing power.

FIG. 10 is a flowchart showing steps taken by the keyboard unit for managing power. Processing commences at 1000 whereupon, at step 1005, the keyboard unit waits to receive a signal from either slate computing unit 350 or from user 1010. The signal from the user may be to attach or detach the keyboard unit from the slate computing unit, to turn the keyboard component on or off, and to move (slide) the keyboard unit in relation to the slate computing unit in order to reveal more or less of the display screen. Signals are also received from the slate computing unit, including a signal that is power that is transmitted from the slate computing unit to the keyboard unit.

A determination is made as to whether the keyboard unit is currently attached to the slate computing unit (decision 1015). If the keyboard unit is currently attached to the slate computing unit, then decision 1015 branches to "yes" branch 1018. In one embodiment, when the units are attached to each other, keyboard unit signals are transmitted to the slate computing unit via the physical connection between the units and, therefore, the wireless interface between the units is not needed. In this embodiment, at step 1020, the keyboard unit's wireless adapter (e.g., Bluetooth) is turned off, and, at step 1025, signals are sent from the keyboard unit to the slate computing unit using the direct connection provided by the attachment. In one embodiment, one of the signals sent to the slate computing unit by the keyboard unit includes the power status of the keyboard unit's battery so that the slate computing unit can determine whether to send power to the keyboard unit in order to power keyboard unit components including charging the keyboard unit battery.

A determination is made as to whether the keyboard unit is currently receiving power from the slate computing unit (decision 1030). If the keyboard unit is currently receiving power from the slate computing unit, then decision 1030 branches to "yes" branch 1032 whereupon, at step 1035, the keyboard unit's battery is charged using the power received from the slate computing unit. At step 1040, any other keyboard unit components that require power are powered using the power received from the slate computing unit. These components may include a backlight or, if the wireless adapter is being used to transmit keyboard unit signals to the slate computing unit, then the keyboard unit's wireless adapter (e.g., Bluetooth) also receives power received from the slate computing unit.

Returning to decision 1030, if the keyboard unit is not currently receiving power from the slate computing unit, then decision 1030 branches to "no" branch 1042 whereupon another determination is made as to whether there are any keyboard components requiring power (decision 1045). If there are no keyboard components requiring power, then decision 1045 branches to "no" branch 1048 whereupon, at step 1050 the keyboard power is turned OFF in order to conserve keyboard unit battery power. On the other hand, if there are keyboard components that require power, then decision 1045 branches to "yes" branch 1052 whereupon, at step 1070, the keyboard unit power is turned ON and the keyboard unit's battery is used to provide power to any keyboard unit component that needs power (e.g., the wireless adapter (Bluetooth), a backlight, etc.).

Returning the decision 1015, if the keyboard unit is not currently attached to the slate computing unit, then decision 1015 branches to "no" branch 1055 whereupon, at step 1060, the keyboard unit's wireless adapter (e.g., Bluetooth) is turned ON so that a wireless interface is established between the keyboard unit and the slate computing unit for transmitting keyboard unit signals to the slate computing unit. At step 1070, power needed to operate the keyboard unit's wireless adapter as well as any other keyboard unit components is received from the keyboard unit's battery.

Figure 11:
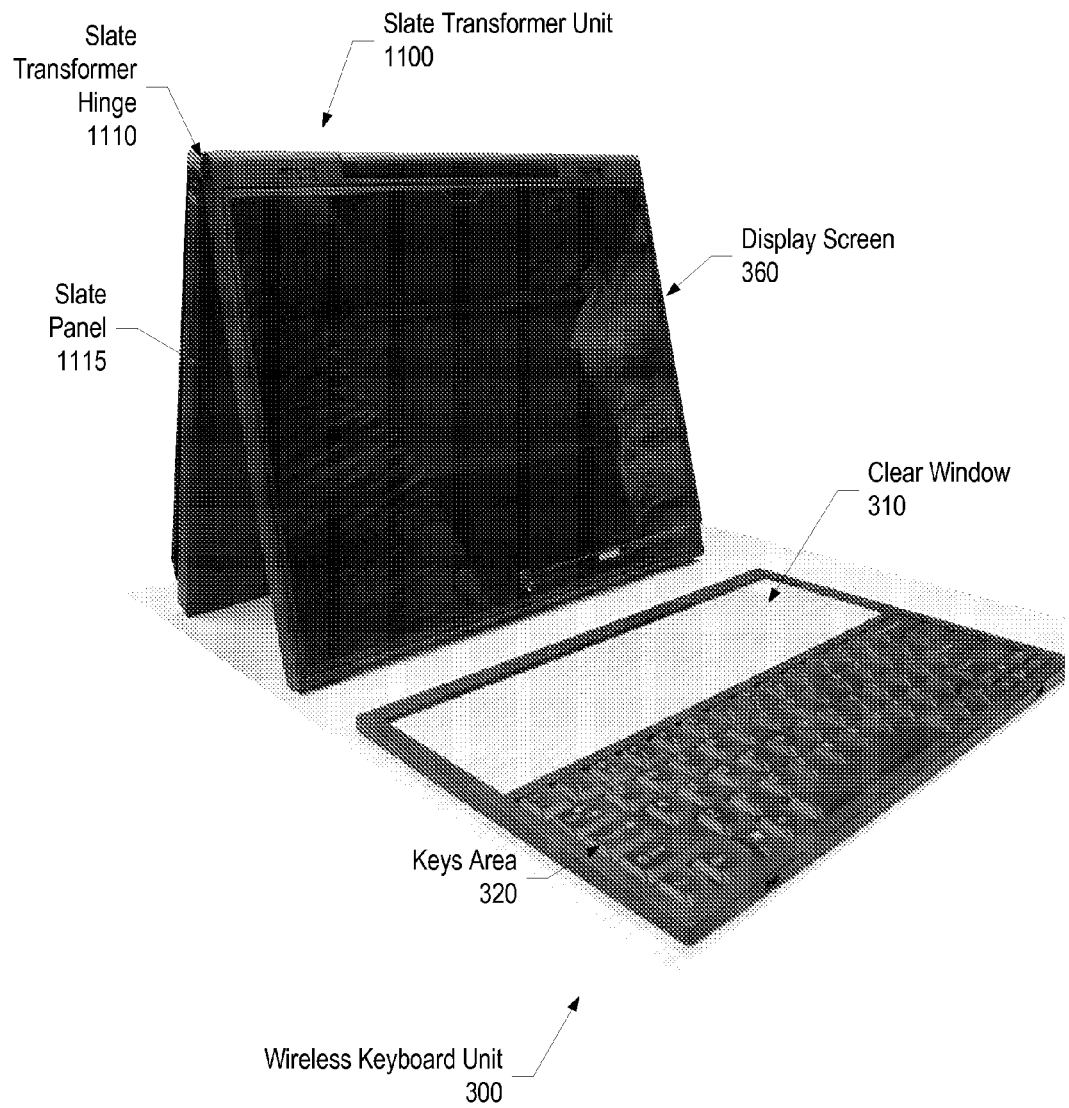
FIG. 11 is a depiction of a slate transformer case in an easel-type configuration with a removable keyboard.

FIG. 11 is a depiction of a slate transformer case in an easel-type configuration with a removable keyboard. Slate transformer unit 1100 includes display screen 360 and slate backside panel 1115 connected using transformer hinge 1110. Wireless keyboard unit 300 wirelessly communicates with slate transformer unit. In one embodiment, slate transformer unit 1100 includes one or more processors and other information handling system components (shown in FIG. 1). In one embodiment, wireless keyboard unit 300 can be attached over the top of display screen 360 so that part of display screen 360 is visible through clear window 310. In another embodiment, wireless keyboard unit 300 can be attached to slate backside panel 1115 and used in a notebook fashion (see, e.g., FIG. 14).

Figure 12:
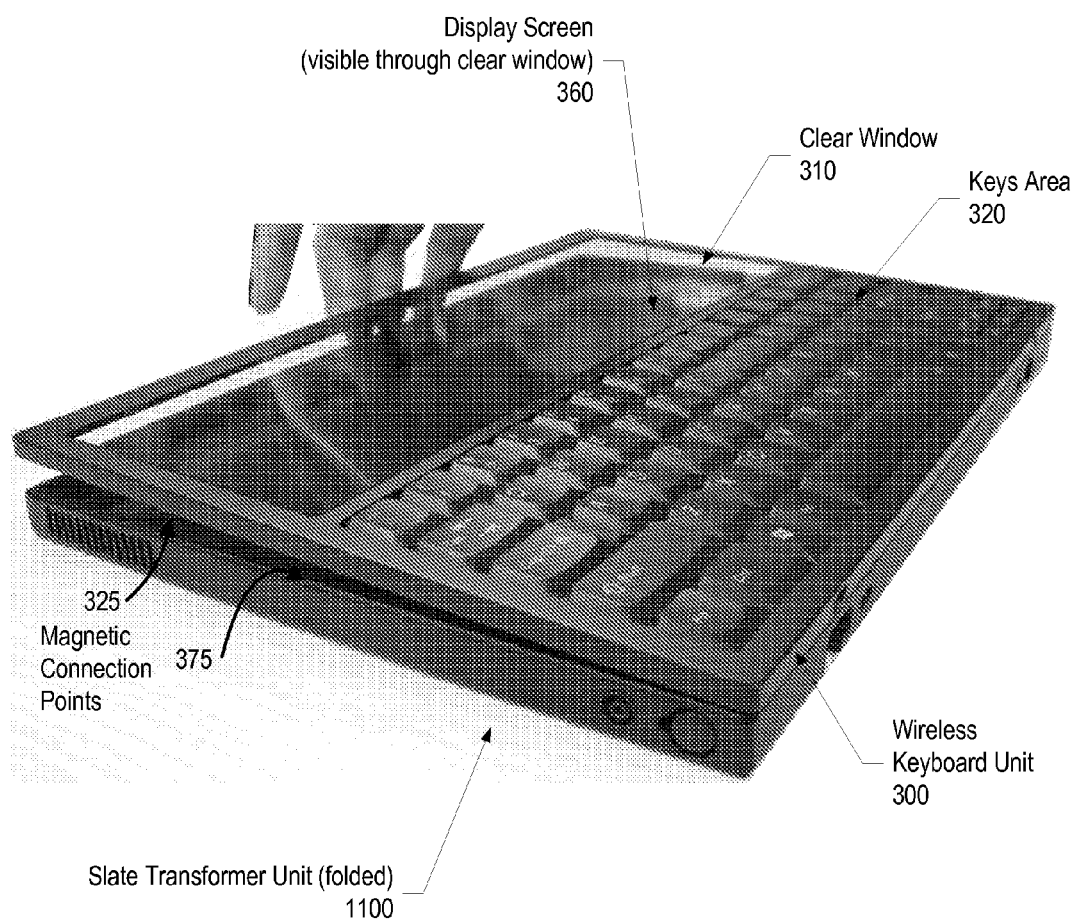
FIG. 12 is a depiction of a slate transformer case being placed in a keyboard-accessible slate configuration.

FIG. 12 is a depiction of a slate transformer case being placed in a keyboard-accessible slate configuration. In FIG. 12, a user is shown placing wireless keyboard unit 300 on display screen 360 so that part of the display is visible through clear window 310. In FIG. 12, the slate backside panel has been folded flat against the backside of display screen 360 so that slate transformer unit 1100 is folded flat. In this manner, the user can use the keyboard (keys area 320) to enter data and the section of the display screen can be seen through clear window 310. This mode of operation may be beneficial in constricted environments, such as when a passenger in an aircraft, automobile, train, or the like.

Figure 13:
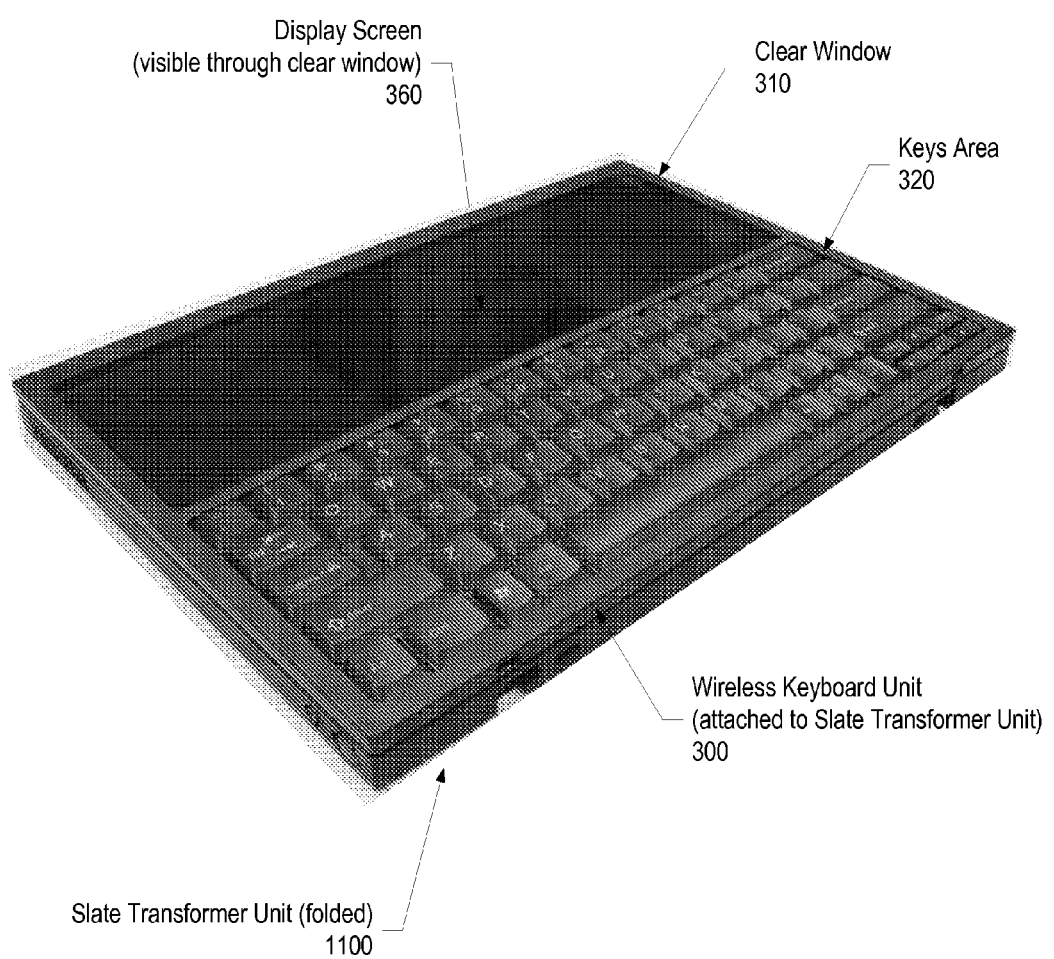
FIG. 13 is a depiction of the slate transformer case in the keyboard-accessible slate configuration.

FIG. 13 is a depiction of the slate transformer case in the keyboard-accessible slate configuration. As shown, wireless keyboard unit 300 is attached to slate transformer unit 1100 (e.g., using a magnetic connection, etc.). As previously described (see, e.g., FIGS. 6-7 and textual descriptions corresponding thereto), in some embodiments the wireless keyboard unit can be charged by the slate transformer unit when attached as shown.

Figure 14:
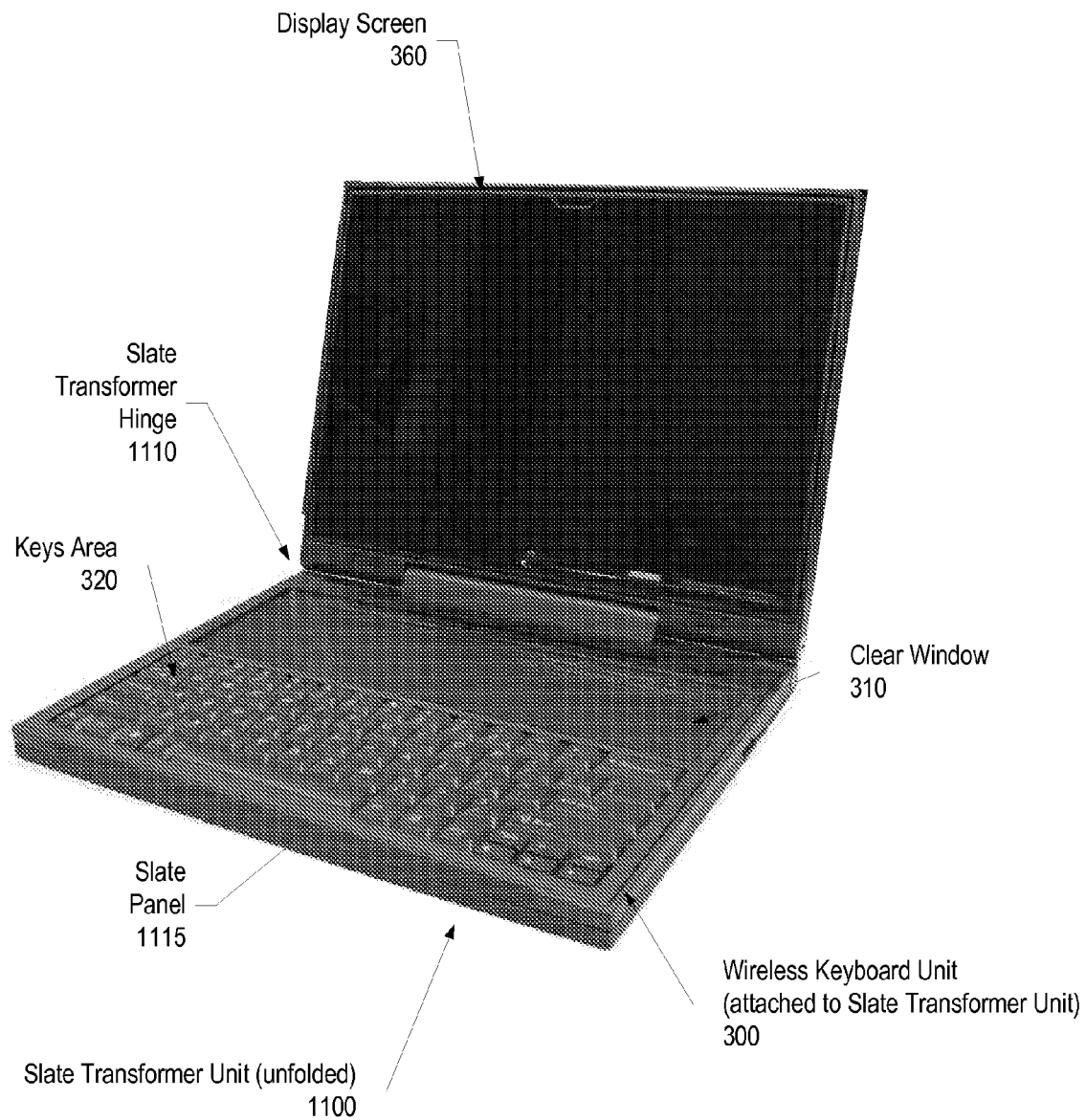
FIG. 14 is a depiction of the slate transformer case in a notebook-style configuration.

FIG. 14 is a depiction of the slate transformer case in a notebook-style configuration. In contrast to FIG. 11, in FIG. 14, panel 1115 is folded so that it lies on a surface (e.g., a table, etc.) and display screen 360 is folded at an angle so that it is visible to the user while using keyboard 300. As shown, wireless keyboard unit 300 is attached to slate panel 1115 of slate transformer unit 1100 (e.g., using a magnetic connection, physical connection, etc.). As previously described (see, e.g., FIGS. 6-7 and textual descriptions corresponding thereto), in some embodiments the wireless keyboard unit can be charged by the slate transformer unit when attached as shown.

Figure 15:
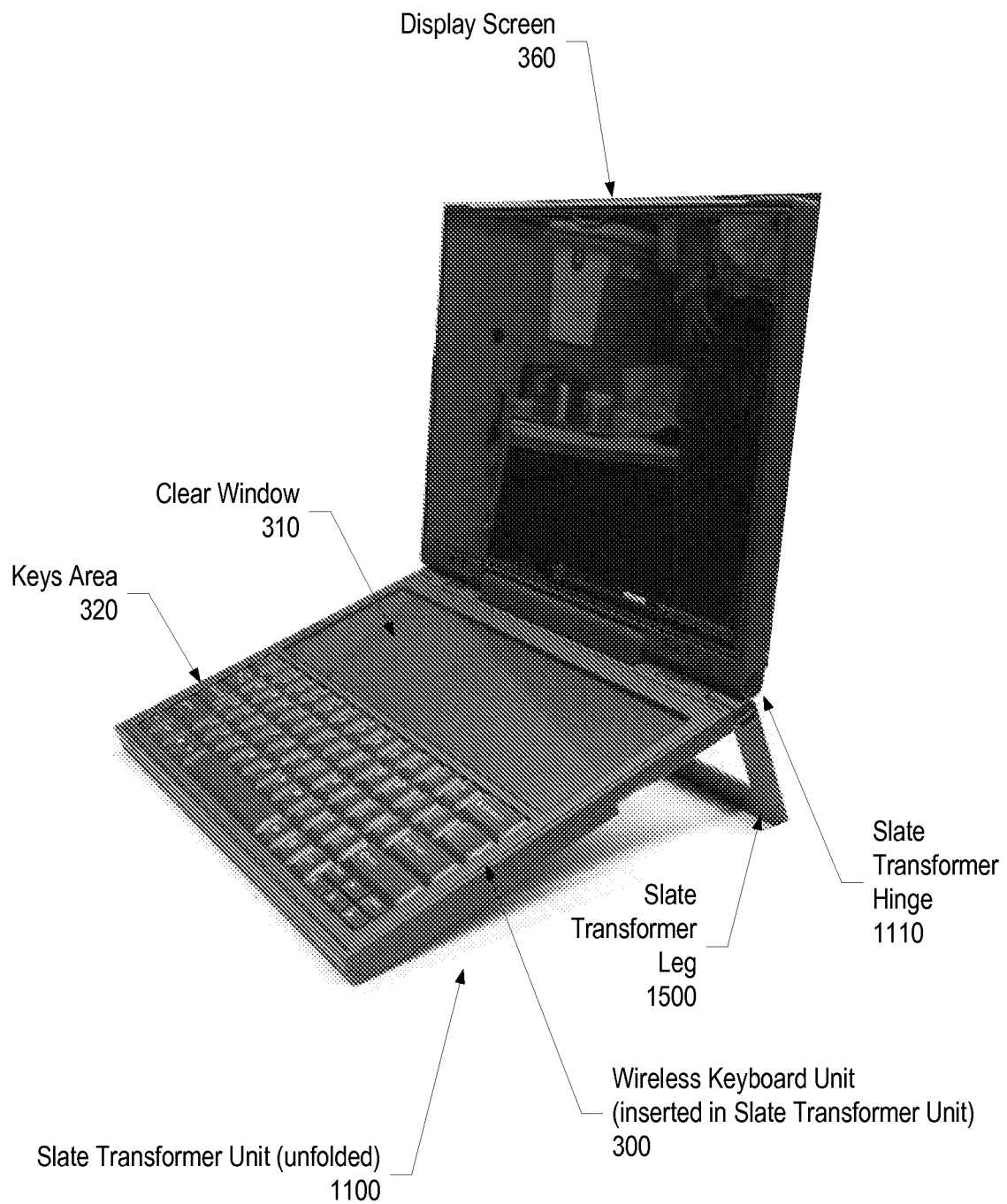
FIG. 15 is a depiction of the slate transformer case in a notebook-style configuration with ergonomic leg support.

FIG. 15 is a depiction of the slate transformer case in a notebook-style configuration with ergonomic leg support. FIG. 15 shows slate transformer leg 1500 being used so that display screen 360 is further elevated and keys area 320 (included in wireless keyboard 300) is at an angle that may be more comfortable, and therefore more ergonomic, to the user.

Figure 16:
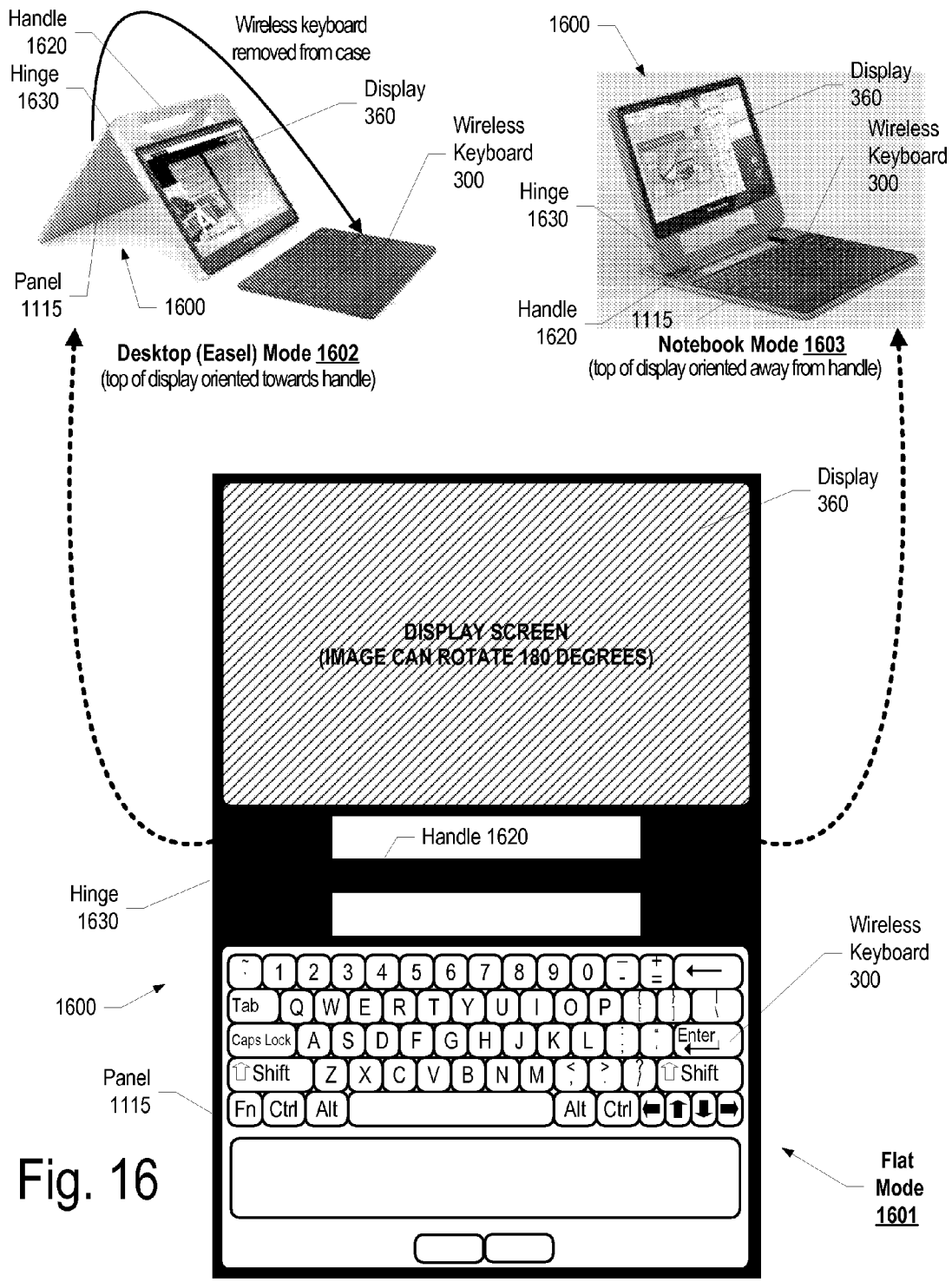
FIG. 16 is a depiction of a transformable display case being transformed into an easel- or notebook-style configuration.

FIG. 16 is a depiction of a transformable display case being transformed into an easel- or notebook-style configuration.

Transformable display case 1600 includes hinge 1630 that connects display screen 360 to panel 1115. In this embodiment, hinge 1630 helps form handle 1620. When folded, handle 1620 can be grasped to transport transformable display case 1600. Transformable display case also includes a wireless keyboard cavity included in panel 1115. In FIG. 16, wireless keyboard 300 is shown inserted into the wireless keyboard cavity in both flat mode 1601 as well as in notebook mode 1603. However, when the system is in desktop, or "easel," mode 1602, wireless keyboard 300 is removed from the wireless keyboard cavity. In desktop mode 1602, the wireless keyboard cavity is not visible because the cavity is on the other side of panel 1115 as shown in desktop mode 1602. Note that the orientation of the display depicted in desktop mode 1602 has the top of the displayed data oriented towards handle 1620. However, when the transformable display case is in notebook mode 1603, the bottom of the displayed data is oriented towards handle 1620. As described in further detail in FIG. 19, the orientation of the display can either be performed automatically by sensing which side of the display is higher or can be performed manually (e.g., having the user press a button on transformable display case, having the user make a selection using display 360, etc.).

Figure 17:
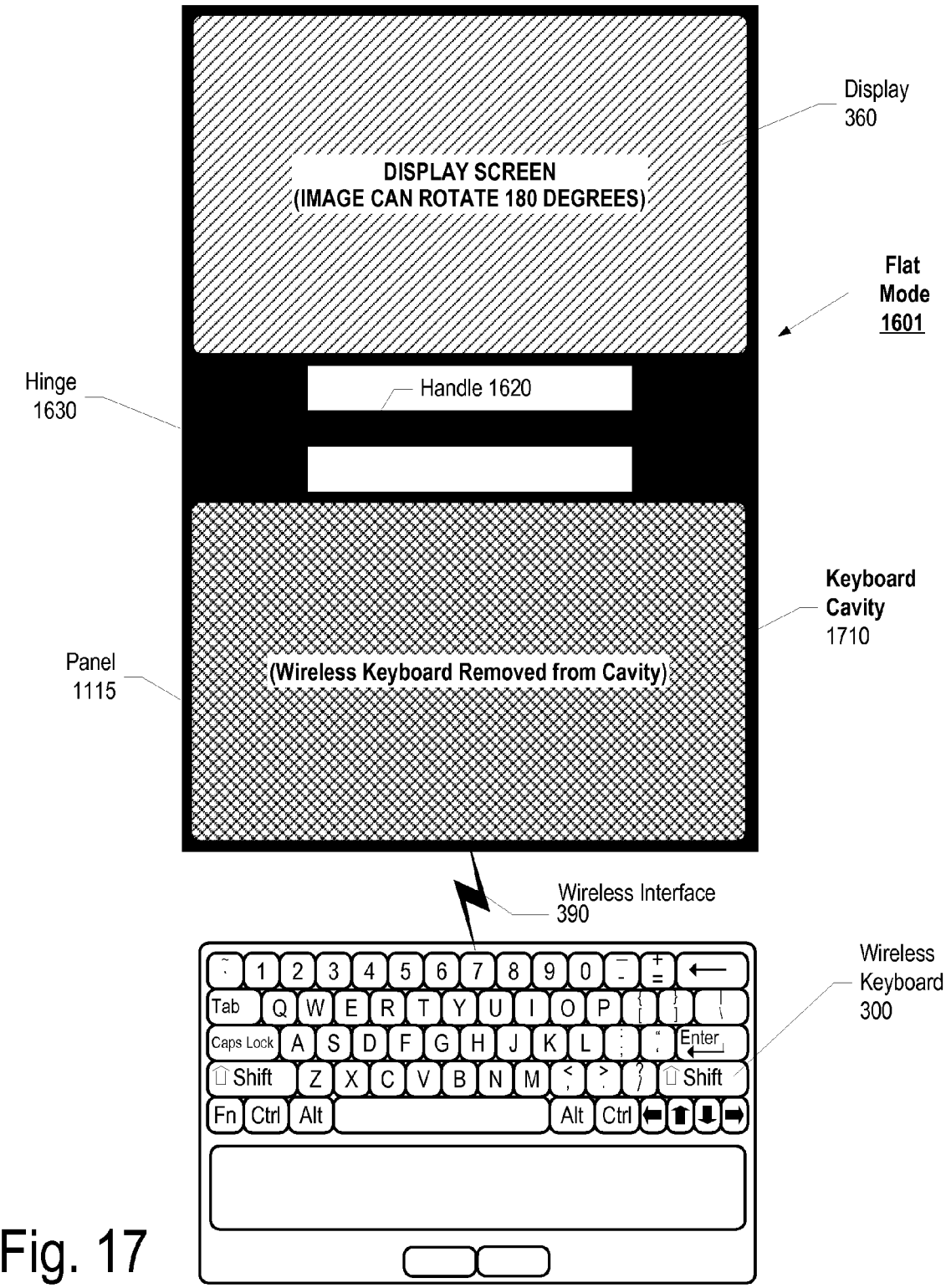
FIG. 17 is a depiction of the wireless keyboard removed from a cavity within the transformable display case.

FIG. 17 is a depiction of the wireless keyboard removed from a cavity within the transformable display case. Transformable display case 1600 appears in flat mode 1601. In FIG. 17, wireless keyboard 300 has been removed from wireless keyboard cavity 1710. Because the keyboard is no longer attached to transformable display case 1600, communications between transformable display case 1600 (e.g., processors and other components of the information handling system) and wireless keyboard 300 is performed using wireless interface 390. When wireless keyboard 300 is removed from transformable display case 1600, the wireless keyboard is powered using one or more rechargeable batteries included in the wireless keyboard unit. When the wireless keyboard unit is returned to transformable display case 1600 by placing the keyboard in keyboard cavity 1710, then, previously described (see, e.g., FIGS. 6-7 and textual descriptions corresponding thereto), the wireless keyboard unit can be charged by the transformer display case when the keyboard is placed in keyboard cavity 1710. In addition, in some embodiments, when the keyboard is attached to the transformer case by placing the keyboard unit 300 in keyboard cavity 1710 (see FIG. 16), then communication between transformer display case 1600 and wireless keyboard 300 can be accomplished without using the wireless interface and the wireless interfaces can be turned off. This might be useful in some environments, such as in hospitals or on airplanes, where wireless communications are not allowed due to the possibility of such wireless communications interfering with equipment in such environments.

Figure 18A:
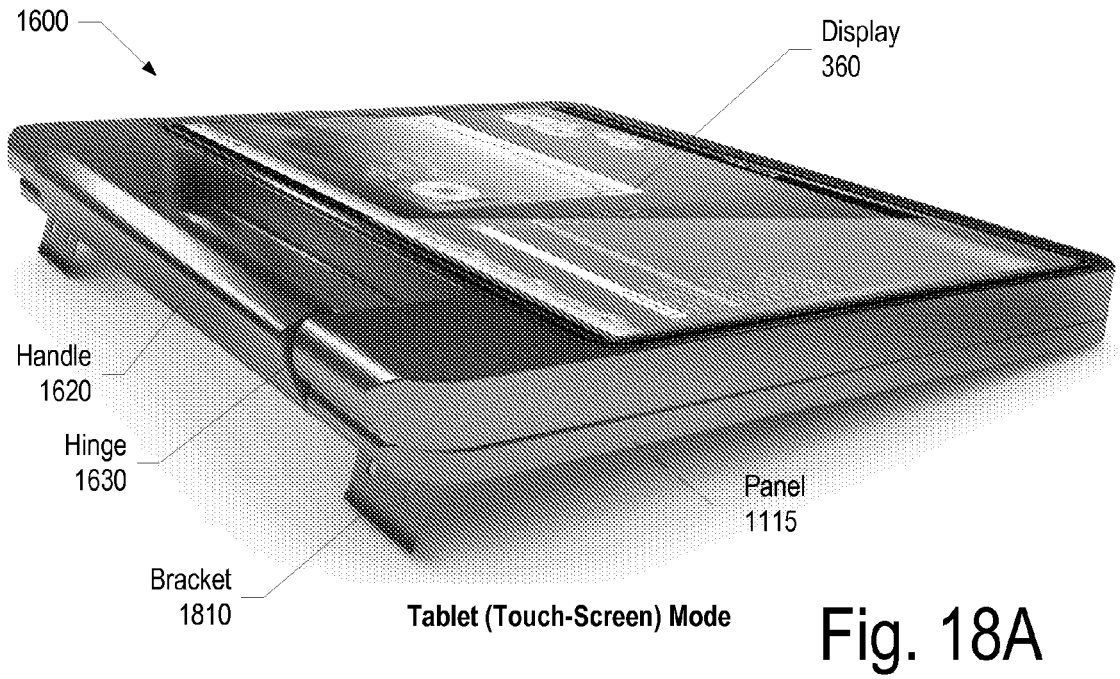
FIG. 18A is a depiction of the transformable display case in a tablet-style configuration.

FIG. 18A is a depiction of the transformable display case in a tablet-style configuration. In the embodiment shown in FIG. 18A, display screen 360 is a touch-sensitive display that allows the user to input data to transformable display case through the touch screen display. In FIG. 18A, the transformable display case has been folded at hinge 1630 so that the backside of display 360 is flush with panel 1115. Brackets 1810 are shown extended so that display screen 360 is somewhat angled towards the user.

Figure 18B:
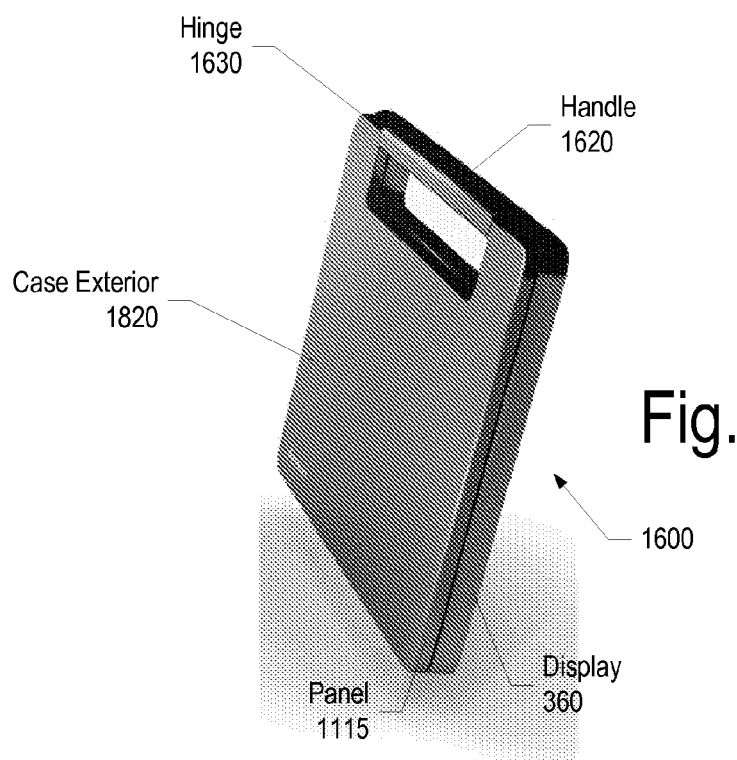
FIG. 18B is a depiction of the transformable display case folded into a protected clamshell configuration.

FIG. 18B is a depiction of the transformable display case folded into a protected clamshell configuration. Here, panel 1115 has been folded almost 360 degrees from the orientation shown in FIG. 18A so that display screen 360 is covered (and protected) by panel 1115. Resilient case exterior 1820 is exposed to the elements and protects the keyboard (inserted into the keyboard cavity that is in panel 1115 and the display screen (keyboard and screen are facing each other inside the folded transformable display case and each are protected by case exterior 1820).

Figure 19:
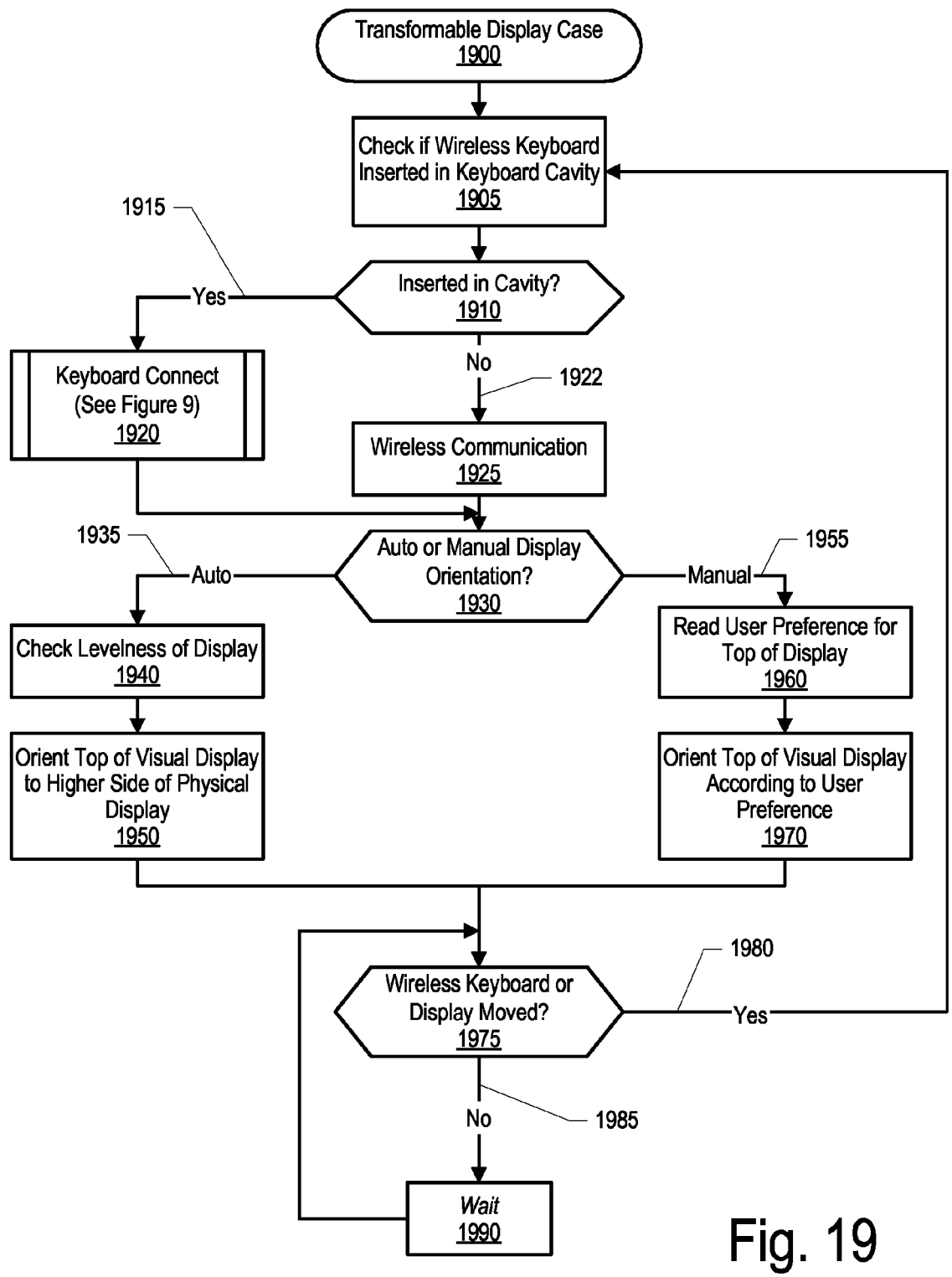
FIG. 19 is a flowchart showing steps taken to orient the screen and charge the wireless keyboard when using a transformable computer case.

FIG. 19 is a flowchart showing steps taken to orient the screen and charge the wireless keyboard when using a transformable computer case. Processing commences at 1900 whereupon, at step 1905, processing checks to determine if the keyboard is currently inserted in the wireless keyboard cavity included in the transformable display case. A determination is made as to whether the wireless keyboard is currently in the wireless keyboard cavity (decision 1910). If the keyboard is in the cavity, then decision 1910 branches to "yes" branch 1915 whereupon, at predefined process 1920, keyboard connection processes take place. On the other hand, if the wireless keyboard is not inserted in the wireless keyboard cavity, then decision 1910 branches to "no" branch 1922 whereupon, at step 1925, the transformable computer case wirelessly communicates with the wireless keyboard and the keyboard unit runs off its internal battery power.

A determination is made as to whether the display is being oriented automatically or manually (decision 1930). If the display is being automatically oriented, then decision 1930 branches to "auto" branch 1935 whereupon, at step 1940, a check is made to determine which side is higher in elevation (the hinged side or non-hinged side) and, at step 1950, the top of the visual display is oriented to the higher side of the physical display. On the other hand, if manual orientation is being used, then decision 1930 branches to "manual" branch 1955 whereupon, at step 1960 the user's orientation preference is retrieved and, at step 1970, the visual display is oriented to coincide with the user's preference.

A determination is made as to whether the wireless keyboard or the display screen has been moved (decision 1975). If either has moved, then decision 1975 loops back to re-perform the processing shown. However, if neither has been moved, then decision 1975 branches to "no" branch 1985 whereupon a wait state (e.g., wait 1 second) is encountered before looping back to check whether either the keyboard or screen has been moved.

One of the preferred implementations of the invention is a client application, namely, a set of instructions (program code) or other functional descriptive material in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. An apparatus comprising:
 a foldable transformable display case that includes two panels hingeably attached and two components attachable to at least one of the panels, wherein one of the components is an integrated display screen and one of the components is a keyboard unit, and wherein at least one of the components is removable from one of the panels;
 a desktop mode where the integrated display screen is included in one of the panels and a hinge that hingeably attaches the two panels is on to of the integrated display screen, wherein the foldable transformable display case is supported on the two sides of the two panels that are opposite from the hinged side of the panels;
 a first visual orientation of data displayed on the integrated display screen where the top of the visual display is towards the hinged side of the panel that includes the integrated display screen when in desktop mode;
 a notebook mode where the integrated display screen is included in one of the panels that is angled at a viewing angle with the other panel supporting the foldable transformable display case on an essentially horizontal surface with the hinge being below the integrated display screen; and
 an second visual orientation of the data displayed on the integrated display screen where the bottom of the visual display is towards the hinged side of the panel that includes the integrated display screen when in notebook mode.

2. The apparatus of claim 1 wherein the keyboard unit is a wireless keyboard unit that is the removable component, wherein the apparatus further comprises:
 a keyboard cavity included in one of the panels, wherein the wireless keyboard unit is inserted in the keyboard cavity.

3. The apparatus of claim 2, the apparatus further comprising:
 one or more system power connection points included in the keyboard cavity and one or more keyboard power connection points are included in the wireless keyboard unit; and
 a power connection established between the foldable transformable display case and the wireless keyboard using the system power connection points and the keyboard power connection points when the wireless keyboard unit is inserted in the keyboard cavity, the power connection charging one or more batteries included in the wireless keyboard unit.

4. The apparatus of claim 1 wherein the integrated display screen is included in a slate computer system, and wherein the slate computer system is the removable component.

5. The apparatus of claim 1 wherein the two panels of the foldable transformable display case form a carrying case when the panels are folded into a clamshell configuration, wherein the integrated display screen is protected in the clamshell configuration.

6. The apparatus of claim 5 further comprising:
 a handle that is used to carry the foldable transformable display case when the panels are folded into the clamshell configuration.

7. The apparatus of claim 1 wherein the keyboard unit is a wireless keyboard unit that is the removable component, the apparatus further comprising:
 a wireless interface connection between the wireless keyboard unit and the foldable transformable display case when in desktop mode.

8. The apparatus of claim 1 further comprising:
 a first battery included in the foldable transformable display case;
 a power adapter that charges the first battery from a power source;
 a second battery included in the keyboard unit, wherein the keyboard unit is a wireless keyboard unit that is the removable component; and
 a power connection established between the wireless keyboard unit and one of the panels of the foldable transformable display case, wherein the second battery is charged using the power connection.

9. The apparatus of claim 1 further comprising:
 a first battery included in the foldable transformable display case;
 a power adapter that charges the first battery from a power source;
 a second battery included in the integrated display screen, wherein the integrated display screen is included in a slate computer system, wherein the slate computer system is the removable component; and
 a power connection established between the slate computer system and one of the panels of the foldable transformable display case, wherein the second battery is charged using the power connection.

10. A method comprising:
 providing a panel from which one of two components are removably attached, the panel being part of a foldable transformable display case that includes two panels hingeably attached, wherein the two components are attachable to at least one of the panels, wherein one of the components is an integrated display screen and one of the components is a keyboard unit;
 providing a desktop mode that is entered when the integrated display screen is included in one of the panels and a hinge that hingeably attaches the two panels is on to of the integrated display screen, wherein the foldable transformable display case is supported on the two sides of the two panels that are opposite from the hinged side of the panels;
 in response to entering the desktop mode, displaying an first visual orientation of data displayed on the integrated display screen where the top of the visual display is towards the hinged side of the panel that includes the integrated display screen;

providing a notebook mode that is entered when the integrated display screen is included in one of the panels that is angled at a viewing angle with the other panel supporting the foldable transformable display case on an essentially horizontal surface with the hinge being below the integrated display screen; and in response to entering the notebook mode, displaying an second visual orientation of the data displayed on the integrated display screen where the bottom of the visual display is towards the hinged side of the panel that includes the integrated display screen.

11. The method of claim 10 wherein the keyboard unit is a wireless keyboard unit that is removed from the panel, wherein the method further comprises:

providing a keyboard cavity that is included in one of the panels into which the wireless keyboard unit is inserted.

12. The method of claim 11 wherein one or more system power connection points are included in the keyboard cavity and one or more keyboard power connection points are included in the wireless keyboard unit, wherein the method further comprises:

providing a power connection that is established between the foldable transformable display case and the wireless keyboard using the system power connection points and the keyboard power connection points when the wireless keyboard unit is inserted in the keyboard cavity; and providing a charge to one or more batteries included in the wireless keyboard unit with the power connection.

13. The method of claim 10 wherein the integrated display screen is included in a slate computer system, and wherein the slate computer system is the removable component.

14. The method of claim 10 further comprising:

forming a carrying case when the panels are folded into a clamshell configuration by folding the two panels of the transformable display case together, wherein the integrated display screen is protected in the clamshell configuration.

15. The method of claim 14 wherein the forming of the carrying case includes forming a handle used to carry the transformable display case when in the clamshell configuration.

16. The method of claim 10 wherein the keyboard unit is a wireless keyboard unit that is the removable component, the method further comprising:

providing a wireless interface connection that is established between the wireless keyboard unit and the foldable transformable display case when in desktop mode.

17. The method of claim 10 wherein a first battery is included in the foldable transformable display case, wherein a second battery is included in the keyboard unit, wherein the keyboard unit is a wireless keyboard unit that is the removable component, and wherein the method further comprises:

providing a charge to the first battery from a power source included in the foldable transformable display case; and providing a power connection that is established between the wireless keyboard unit and one of the panels of the foldable transformable display case, wherein the second battery is charged using the power connection.

18. The method of claim 10 wherein a first battery is included in the foldable transformable display case, wherein a second battery is included in the keyboard unit, wherein the keyboard unit is a wireless keyboard unit that is the removable component, and wherein the method further comprises:

providing a charge to the first battery from a power source included in the foldable transformable display case; and providing a power connection that is established between the slate computer system and one of the panels of the foldable transformable display case, wherein the second battery is charged using the power connection.

\* \* \* \* \*